(12) United States Patent
Mine et al.

(10) Patent No.: US 9,008,577 B2
(45) Date of Patent: Apr. 14, 2015

(54) INFORMATION PROCESSING APPARATUS, INFORMATION PROCESSING SYSTEM, AND PROGRAM

(75) Inventors: Aramu Mine, Kanagawa (JP); Toyohide Isshi, Kanagawa (JP); Naoki Matsubara, Nagano (JP)

(73) Assignee: Sony Corporation, Tokyo (JP)

( * ) Notice: Subject to any disclaimer, the term of this patent is extended or adjusted under 35 U.S.C. 154(b) by 19 days.

(21) Appl. No.: 13/698,811

(22) PCT Filed: Apr. 7, 2011

(86) PCT No.: PCT/JP2011/058772
§ 371 (c)(1),
(2), (4) Date: Jan. 14, 2013

(87) PCT Pub. No.: WO2011/148722
PCT Pub. Date: Dec. 1, 2011

(65) Prior Publication Data
US 2013/0109310 A1 May 2, 2013

(30) Foreign Application Priority Data
May 28, 2010 (JP) ................................ 2010-123316

(51) Int. Cl.
*H04B 5/00* (2006.01)
*H04B 7/00* (2006.01)
(Continued)

(52) U.S. Cl.
CPC ............ *H04B 5/0025* (2013.01); *G06F 3/0488* (2013.01); *H04M 1/7253* (2013.01); *H04M 1/72569* (2013.01); *H04M 2250/04* (2013.01);
(Continued)

(58) Field of Classification Search
USPC ................ 455/41.1–41.2, 557, 550.1, 552.1, 455/554.2, 556.1, 560
See application file for complete search history.

(56) References Cited

U.S. PATENT DOCUMENTS 7,280,851 B2 * 10/2007 Oba et al. ....................... 455/566
8,210,427 B2 * 7/2012 Noda et al. .................... 235/382
(Continued)

FOREIGN PATENT DOCUMENTS

| JP | 2002 16975 | 1/2002 |
| JP | 2005-100050 A | 4/2005 |

(Continued)

OTHER PUBLICATIONS

U.S. Appl. No. 13/643,126, filed Oct. 24, 2012, Matsubara, et al.
(Continued)

*Primary Examiner* — Andrew Wendell
*Assistant Examiner* — Cindy Trandai
(74) *Attorney, Agent, or Firm* — Oblon, McClelland, Maier & Neustadt, L.L.P.

(57) ABSTRACT

Provided is an information processing apparatus including a transmission processing unit (106) that performs near-field one-to-one communication with a communication counterpart device, a reception processing unit (108), a reception signal intensity detection section (114) that acquires communication a communication situation with the communication counterpart device, a display processing unit (118) that performs a display process for performing guidance in a direction in which the communication situation is favorable based on the acquired communication situation, and a display unit (302) that performs display for the guidance.

16 Claims, 34 Drawing Sheets

(51) Int. Cl.
*H04B 1/18* (2006.01)
*G06F 3/0488* (2013.01)
*H04M 1/725* (2006.01)
*G06F 1/16* (2006.01)

(52) U.S. Cl.
CPC ....... *H04M 2250/12* (2013.01); *H04M 2250/22* (2013.01); *G06F 1/1632* (2013.01)

(56) References Cited

U.S. PATENT DOCUMENTS

| | | | |
|---|---|---|---|
| 2008/0311957 A1* | 12/2008 | Jantunen et al. | 455/560 |
| 2009/0111378 A1* | 4/2009 | Sheynman et al. | 455/41.1 |
| 2009/0250517 A1* | 10/2009 | Brandin et al. | 235/439 |
| 2010/0021176 A1* | 1/2010 | Holcombe et al. | 398/115 |
| 2010/0033512 A1 | 2/2010 | Kito | |
| 2010/0252622 A1* | 10/2010 | Bedore | 235/380 |
| 2010/0325234 A1* | 12/2010 | Hiroki | 709/207 |
| 2011/0294417 A1* | 12/2011 | Mine et al. | 455/41.1 |
| 2011/0294426 A1 | 12/2011 | Matsubara et al. | |
| 2011/0294433 A1 | 12/2011 | Matsubara et al. | |
| 2012/0019674 A1* | 1/2012 | Ohnishi et al. | 348/207.1 |
| 2013/0141567 A1* | 6/2013 | Walker et al. | 348/135 |

FOREIGN PATENT DOCUMENTS

| | | |
|---|---|---|
| JP | 2005 333283 | 12/2005 |
| JP | 2007 88943 | 4/2007 |
| JP | 2007-299134 A | 11/2007 |
| JP | 2007-316925 A | 12/2007 |
| JP | 2008-97151 A | 4/2008 |
| JP | 2008-148148 A | 6/2008 |
| JP | 2009-25997 A | 2/2009 |
| JP | 2009-37401 A | 2/2009 |
| JP | 2009-49871 A | 3/2009 |
| JP | 2009-230469 A | 10/2009 |
| JP | 2010 45515 | 2/2010 |
| WO | WO 03/021875 A1 | 3/2003 |

OTHER PUBLICATIONS

U.S. Appl. No. 14/268,620, filed May 2, 2014, Matsubara, et al.
International Search Report Issued Jun. 7, 2011 in PCT/JP11/58772 Filed Apr. 7, 2011.

* cited by examiner

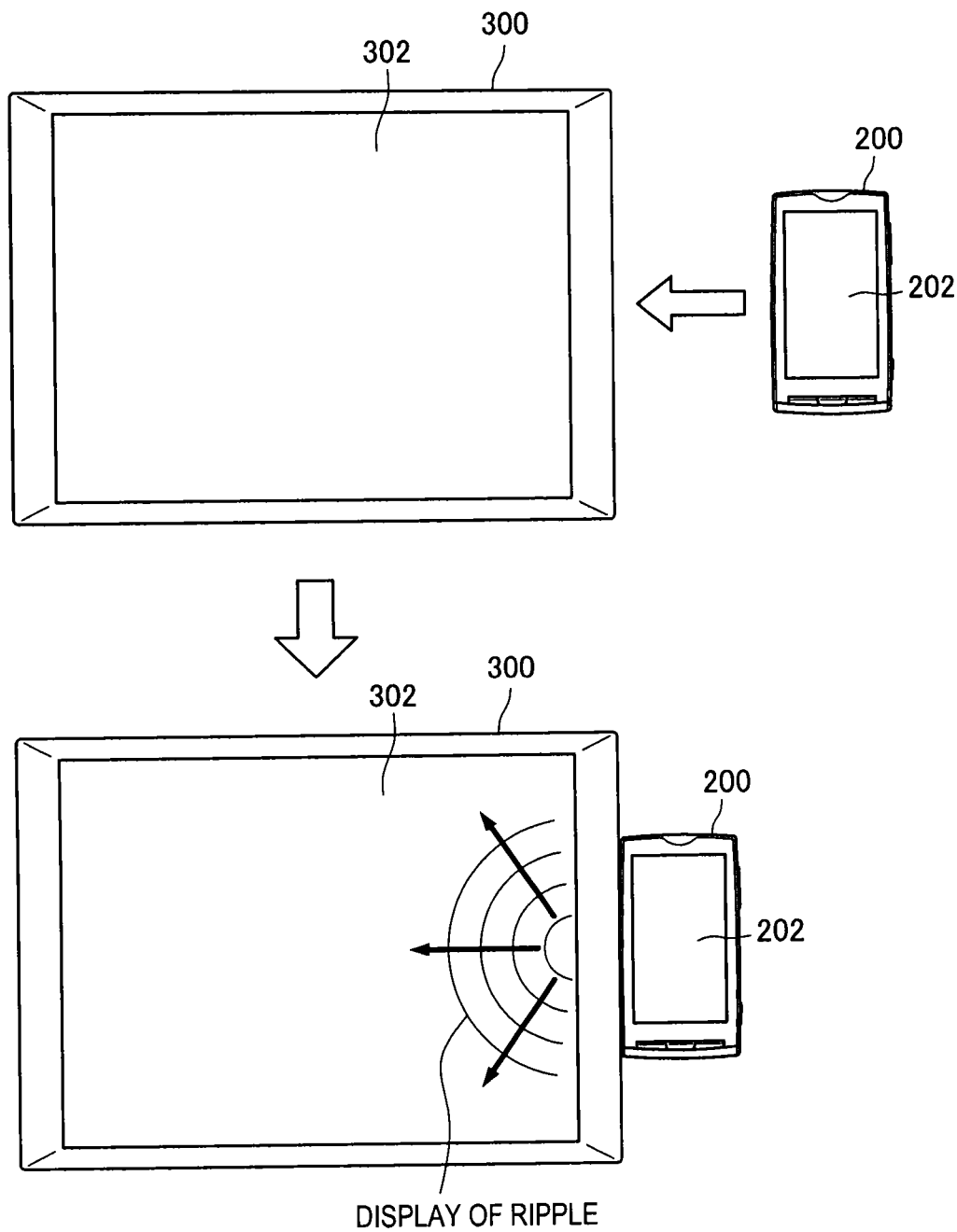

FIG.13
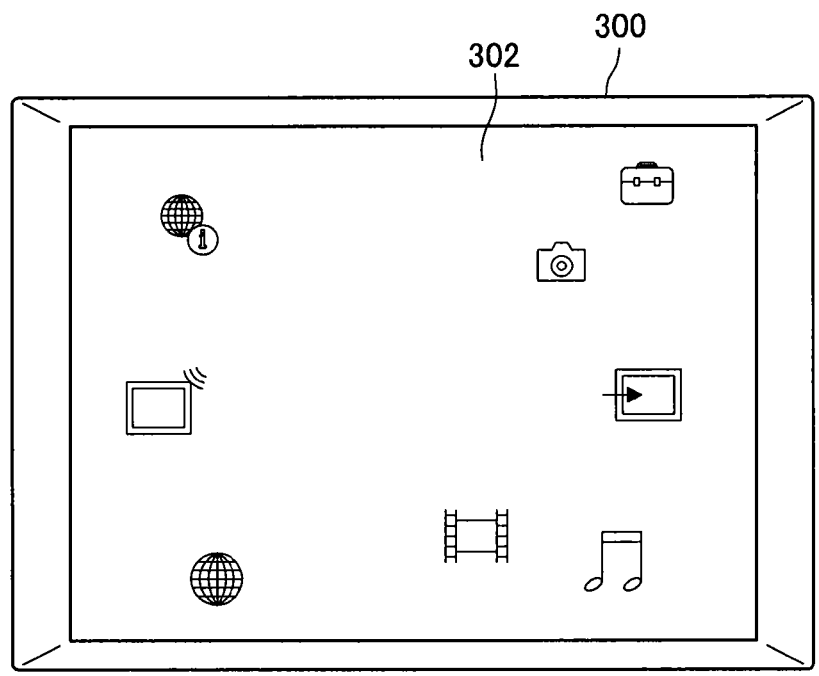
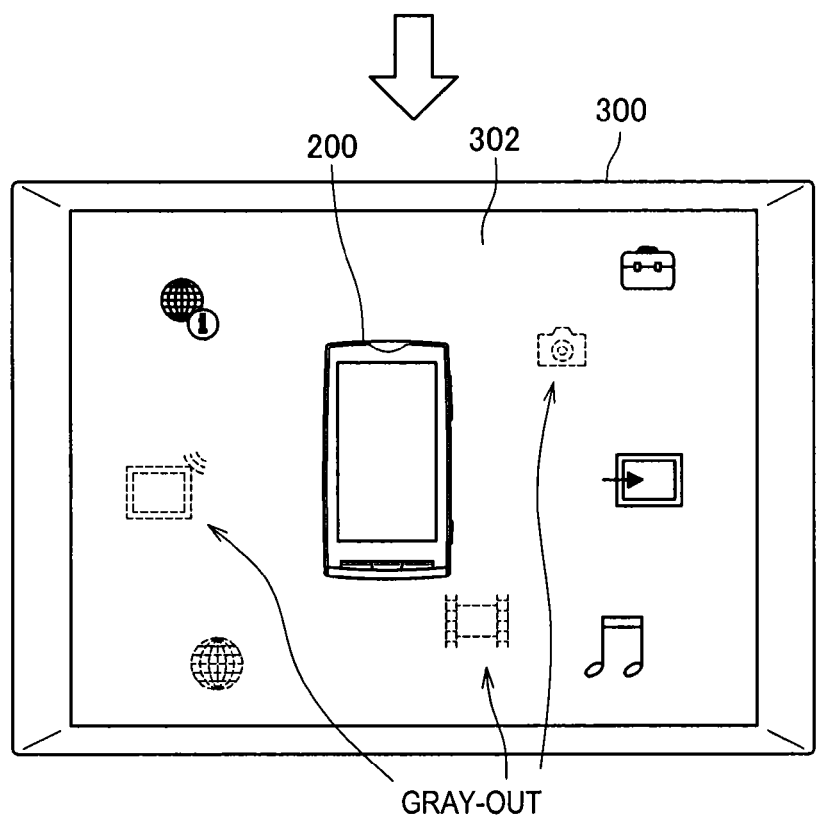
GRAY-OUT

FIG.19
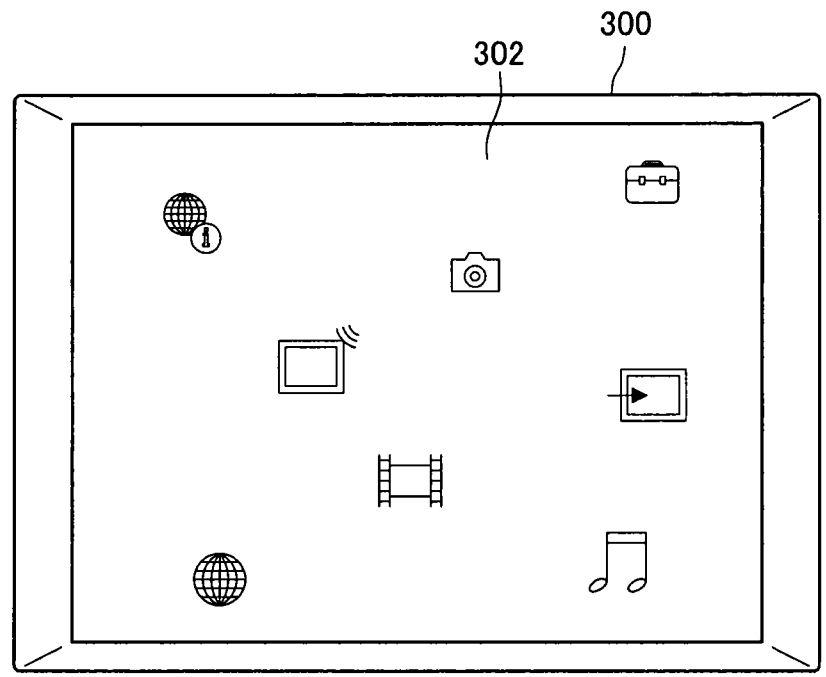
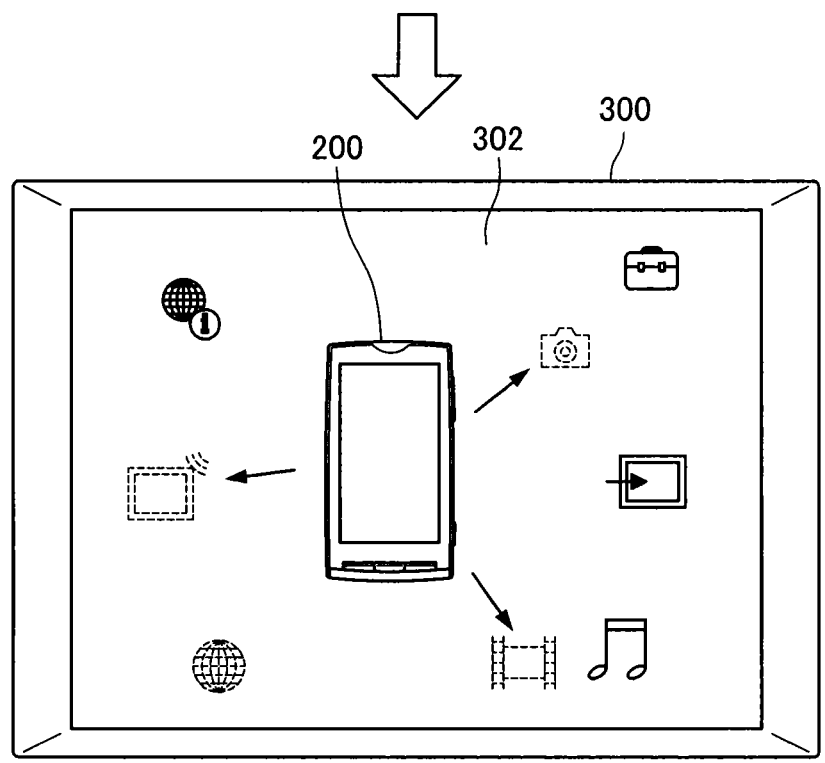

FIG.24
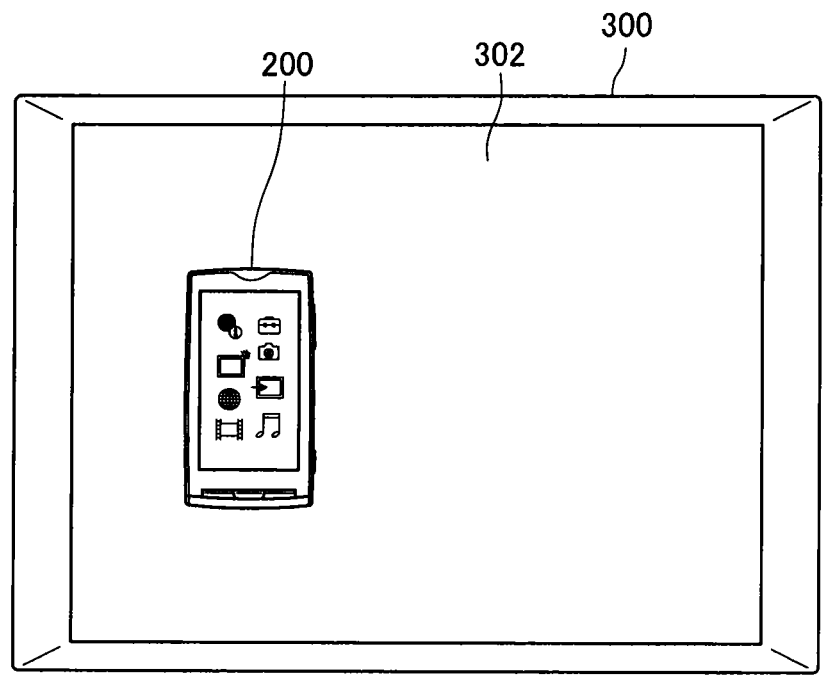
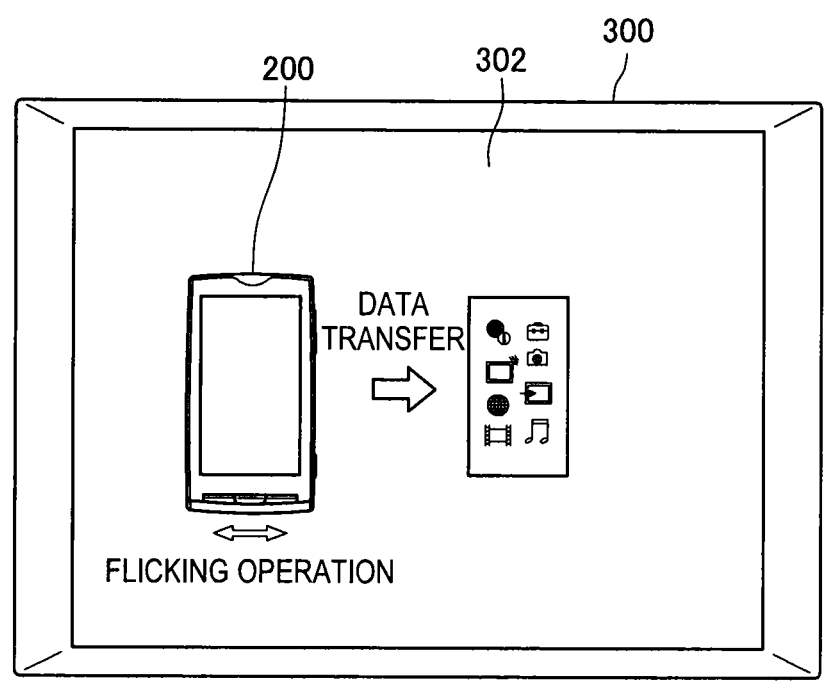

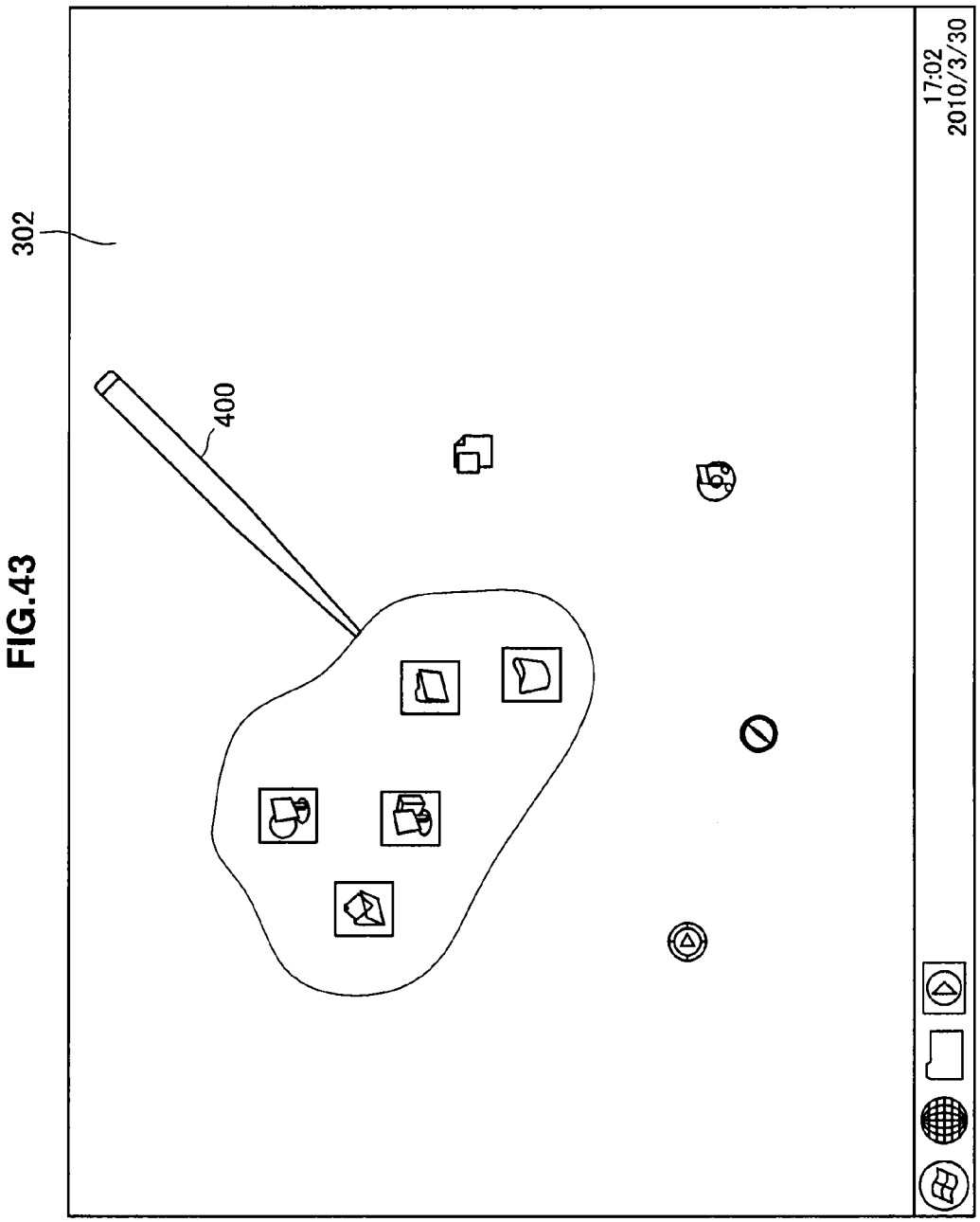

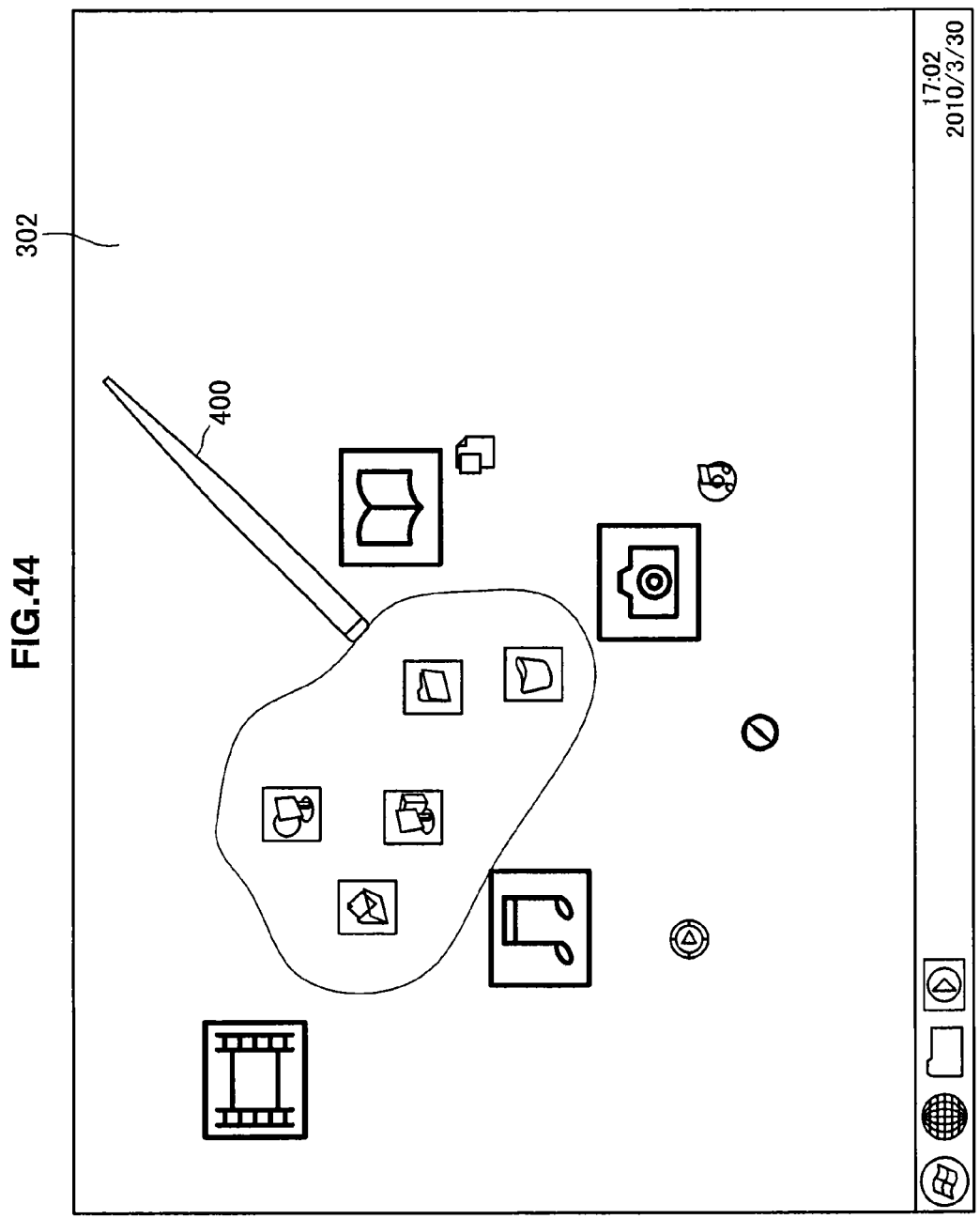

INFORMATION PROCESSING APPARATUS, INFORMATION PROCESSING SYSTEM, AND PROGRAM

TECHNICAL FIELD

The present invention relates to an information processing apparatus, an information processing system, and a program.

BACKGROUND ART

With regard to the related art, the patent literatures described below disclose systems that realize a desired operation when non-contact wireless communication is conducted using a mobile device such as a mobile telephone, or the like. In addition, Patent Literature 10 discloses a configuration of an electronic pen that uses wireless communication.

CITATION LIST

Patent Literature

Patent Literature 1: JP 2009-37401A
Patent Literature 2: JP 2007-316925A
Patent Literature 3: JP 2009-25997A
Patent Literature 4: JP 2009-49871A
Patent Literature 5: Specification of International Patent Application Publication No. 2003/21875
Patent Literature 6: JP 2009-230469A
Patent Literature 7: JP 2005-100050A
Patent Literature 8: JP 2008-97151A
Patent Literature 9: JP 2008-148148A
Patent Literature 10: JP 2007-299134A

SUMMARY OF INVENTION

Technical Problem

However, in all techniques disclosed in Patent Literatures 1 to 10 described above, it is merely assumed that display information is simply displayed on a screen, and thus, it is difficult for a user to instantly recognize and understand various kinds of information related to a wireless communication. In particular, a communication situation of the wireless communication is changed according to a location of an apparatus, but it is difficult for a user to perform a desired operation by instantly determining the communication situation.

Therefore, it is desirable to provide a novel and improved information processing apparatus, information processing system, and program capable of performing a desired operation by instantly determining a communication situation with a communication counterpart device.

Solution to Problem

According to an embodiment of the present invention, there is provided an information processing apparatus including a communication unit that performs near-field one-to-one communication with a communication counterpart device, a communication situation acquisition unit that acquires a communication situation with the communication counterpart device, a display processing unit that performs a display process for performing guidance in a direction in which the communication situation is favorable based on the acquired communication situation, and a display unit that performs display for the guidance.

Further, the communication unit may have a plurality of antennas, and the communication situation acquisition unit may acquire a communication situation with the communication counterpart device based on the intensity of a reception signal obtained by each of the plurality of antennas.

Further, the display processing unit may perform a process for displaying a display indicating a direction in which the communication situation is favorable on the display unit.

Further, the information processing apparatus may further include an output unit that outputs a sound or a vibration for facilitating the guidance in the direction in which the communication situation is favorable.

Further, according to another embodiment of the present invention, there is provided an information processing system including a first device that performs communication with a second device using near-field one-to-one communication, and a second device that includes a communication unit that performs near-field one-to-one communication with the first device, a communication situation acquisition unit that acquires a communication situation with the first device, a display processing unit that performs a display process for performing guidance in a direction in which the communication situation is favorable based on the acquired communication situation, and a display unit that performs display for the guidance.

Further, according to another embodiment of the present invention, there is provided a program that causes a computer to function as means for performing near-field one-to-one communication with a communication counterpart device, means for acquiring a communication situation with the communication counterpart device, and means for performing a display process for performing guidance in a direction in which the communication situation is favorable based on the acquired communication situation.

Advantageous Effects of Invention

According to the present invention, it is possible to perform a desired operation by instantly determining a communication situation with a communication counterpart device.

BRIEF DESCRIPTION OF DRAWINGS

FIG. 9 is a schematic diagram showing an example in which the mobile device is brought close to a side of the information processing apparatus 300.

FIG. 13 is a schematic diagram showing a display appearance in which the function icons of the mobile device that are unavailable are grayed out and those that are available are brightly displayed depending on the functions thereof.

FIG. 19 is a schematic diagram showing an example in which icons are moved out of the way of the mobile device.

FIG. 24 is a schematic diagram showing a state in which, when contents being reproduced in the mobile device are flicked on the display unit, data thereof is transferred to the information processing apparatus.

FIG. 43 is a schematic diagram showing a state in which the electronic pen is used.

FIG. 44 is a schematic diagram showing another state in which the electronic pen is used.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Note that description will be provided in the order below.
1. First Embodiment (A display process when a mobile device is connected to an information processing apparatus)

2. Second Embodiment (Movement of contents between a mobile device and an information processing apparatus)
3. Third Embodiment (Synchronization of information between a mobile device and an information processing apparatus)
4. Fourth Embodiment (Guidance to a location in which a communication situation is favorable)
5. Fifth Embodiment (A configuration example of an electronic pen)

1. First Embodiment

Figure 1:
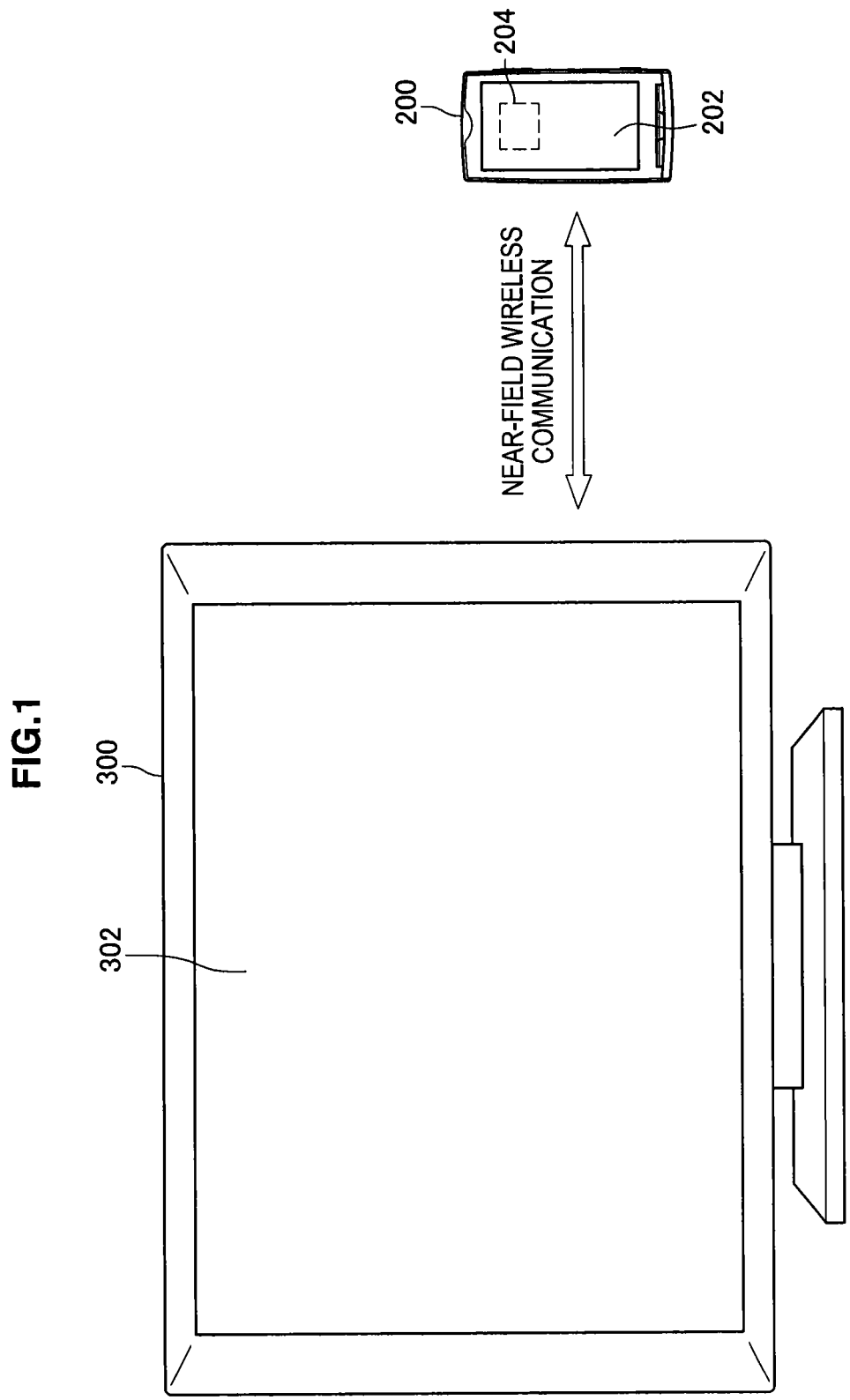
FIG. 1 is a schematic diagram showing a configuration example of an information processing system according to a first embodiment.

FIG. 1 is a schematic diagram showing a configuration example of an information processing system according to a first embodiment of the present invention. As illustrated in FIG. 1, the information processing system 100 according to the present embodiment includes a mobile device 200 and an information processing apparatus 300 that includes a display unit 302 (a display) of a relatively large size.

The mobile device 200 and the information processing apparatus 300 are configured to be able to transfer large-capacity data to each other using near-field wireless communication. As a type of near-field wireless communication, for example, TransferJet (a registered trademark) can be used.

The mobile device 200 is an electronic device having the functions of a mobile telephone, a smart phone, a digital camera, and the like. The mobile device 200 is provided with a display unit 202. The information processing apparatus 300 is an apparatus such as a personal computer (PC), a television receiver set, or the like, and has a display unit 302 having a relatively large size including, for example, a liquid crystal display (LCD) panel, or the like. On the entire face of the display unit 302, a touch panel (touch sensor) is provided.

In this system, when the mobile device 200 is brought close to the information processing apparatus 300, the connection of the mobile device 200 and the information processing apparatus 300 is established using near-field wireless communication. Then, information retained in the mobile device 200 is transmitted to the information processing apparatus 300, and the result of a process performed in accordance with the transmitted information is displayed on the display unit 302 of the information processing apparatus 300.

The mobile device 200 and the information processing apparatus 300 have electrode plates (antennas) 204 and 304 which are called electric field couplers that enable mutual electric field coupling. When the electric field couplers of both the mobile device 200 and the information processing apparatus 300 are brought into close proximity, for example, within 3 cm, a change in an inductive magnetic field generated by the electric field coupler on one side is sensed by the electric field coupler on the other side, and thus one-to-one electric field communication between the mobile device 200 and the information processing apparatus 300 is realized.

More specifically, between the pair of devices performing the electric field communication described above, one functions as an initiator and the other functions as a responder. The initiator is the side making a connection establishment request, and the responder is the side awaiting a connection establishment request from the initiator.

When the mobile device 200 shown in FIG. 1 functions as the initiator and the information processing apparatus 300 functions as the responder, for example, in the case in which the mobile device 200 and the information processing apparatus 300 are brought into close proximity to each other, the information processing apparatus 300 receives a connection establishment request (connection requesting frame) transmitted from the mobile device 200. Then, when the connection establishment request is received by the information processing apparatus 300, the information processing apparatus 300 transmits a connection response permit (connection response frame) to the mobile device 200. Then, when the mobile device 200 receives the connection response permit, connection of communication between the information processing apparatus 300 and the mobile device 200 is established. After the connection is established, or at the same time as the establishment of the connection, the information processing apparatus 300 and the mobile device 200 perform an authentication process, and when the authentication process ends in a normal manner, the information processing apparatus 300 and the mobile device 200 are in a state in which data communication is possible. As such an authentication process, for example, checking the version of software, the type of data transfer, coincidence of protocols that respective devices have between the information processing apparatus 300 and the mobile device 200, or the like can be exemplified.

After that, the information processing apparatus 300 and the mobile device 200 perform one-to-one data communication. More specifically, the mobile device 200 transmits arbitrary data to the information processing apparatus 300 using the electric field coupler. Alternatively, the information processing apparatus 300 transmits arbitrary data to the mobile device 200 using the electric field coupler. As arbitrary data, for example, music data for music, lectures, radio programs, and the like, video data such as movies, television programs, video programs, photos, documents, drawings, diagrams, and the like, games, software, and the like can be exemplified.

Herein, whereas radio waves radiated from an antenna of a radio wave communication type attenuate in inverse proportion to the square of a distance, the intensity of an inductive electric field generated from such an electric field coupler is inversely proportional to the fourth power of a distance, and thus there is an advantage in that the distance between a pair of devices that can perform electric field communication can be restricted. In other words, according to the electric field communication, effects that deterioration of signals due to surrounding obstacles seldom occurs and techniques for preventing hacking and securing confidentiality can be simplified are obtained.

In addition, a radio wave radiated from an antenna has horizontal wave components oscillating in the orthogonal direction to the traveling direction of the radio wave, and also includes a polarized wave. On the other hand, an electric field coupler has vertical wave components oscillating in the traveling direction, and generates an inductive electric field without a polarized wave, and thus the scheme has excellent convenience in that a receiving side can receive signals when faces of a pair of electric field couplers face each other.

Note that, in the present specification, description has been provided focusing on the example in which a pair of communication devices perform near-field wireless communication (non-contact communication or TransferJet) using electric field couplers, but the present invention is not limited to this example. For example, the pair of communication devices also can perform near-field wireless communication via communication units thereof that can communicate with each other using magnetic field coupling. According to communication schemes using electric field coupling and magnetic field coupling, since a signal is not transmitted when communication counterparts are not brought into close proximity to each other, a problem of interference is not likely to occur, which is more advantageous than the radio wave communication scheme.

Figure 2:
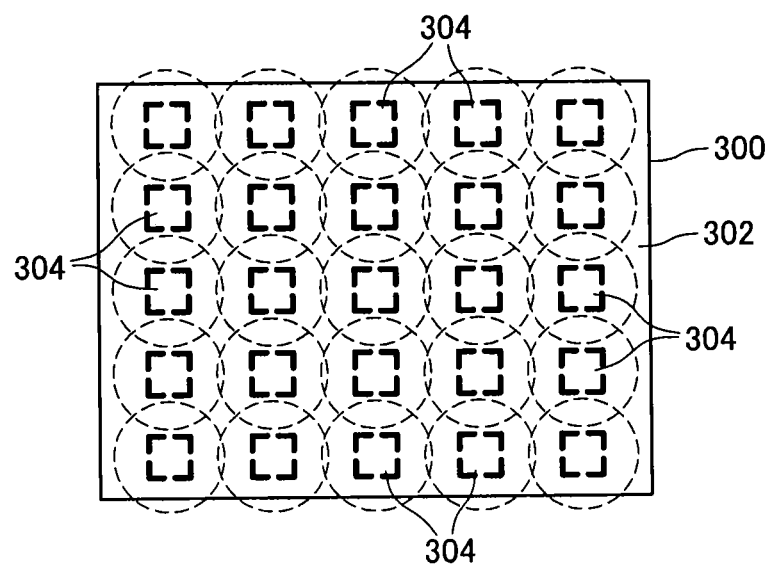
FIG. 2 is a schematic diagram showing an arrangement of electrode plates (antennas) provided in an information processing apparatus.

FIG. 2 is a schematic diagram showing an arrangement of electrode plates (antenna) 304 provided in the information processing apparatus 300. In the example illustrated in FIG. 2, a plurality of electrode plates 304 are provided on the rear face of the information processing apparatus 300. In this manner, by providing the plurality of electrode plates 304 over the entire region of the inner face of the information processing apparatus 300 and setting the intensity of a reception signal to be a proper value, when the mobile device 200 is brought close to the display unit 302 on the surface of the information processing apparatus 300, communication connection between the mobile device 300 and the information processing apparatus 300 can be established.

Figure 3A:
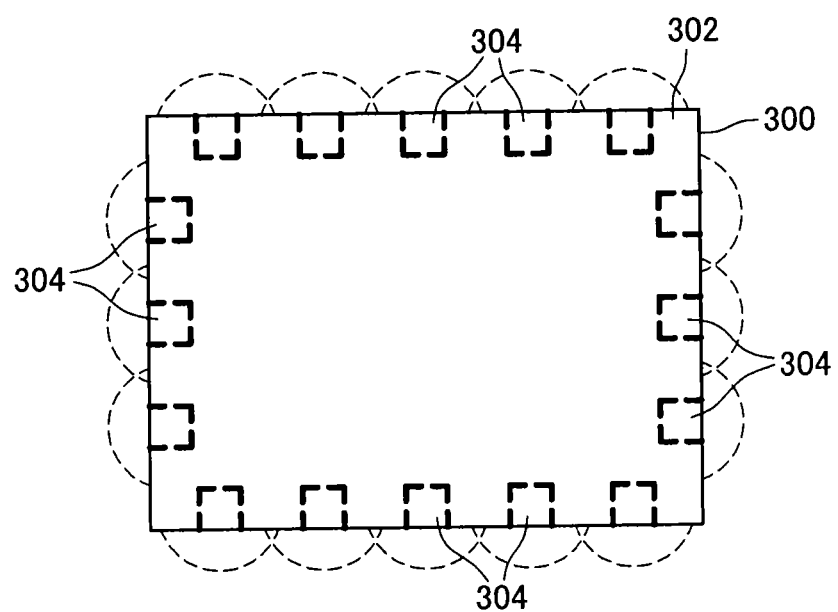
FIG. 3A is a schematic diagram showing another example of the electrode plates.
Figure 3B:
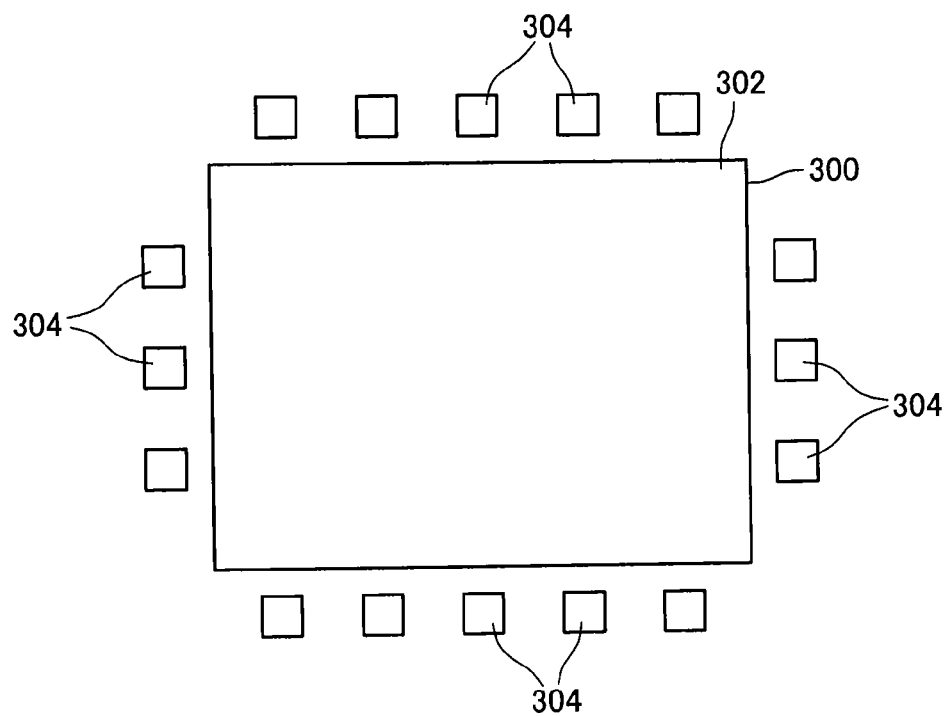
FIG. 3B is a schematic diagram showing still another example of the electrode plates.

In addition, FIGS. 3A and 3B are schematic diagrams showing another example of the arrangement of the electrode plates 304. In the example illustrated in FIG. 3A, the plurality of electrode plates 304 are arranged along the contour of the information processing apparatus 300. According to this configuration, when the mobile device 200 is brought close to a side of the information processing apparatus 300, information retained in the mobile device 300 can be transmitted to the information processing apparatus 300. In addition, FIG. 3B is a schematic diagram showing still another example of the arrangement of the electrode plates 304. In the example illustrated in FIG. 3B, the plurality of electrode plates 304 are arranged along the external contour of the display unit 302 as an inward-facing antenna. According to this configuration, when the mobile device 200 is brought close to the display unit 302 even when the display unit 302 is formed of a material through which it is difficult for radio waves to penetrate, information retained in the mobile device 200 can be transmitted to the information processing apparatus 300. As illustrated in FIG. 3B, when the electrode plates 304 are arranged on the edge of the display unit 302, a frame including a non-metal portion for wireless communication can be configured to be separately provided so as to cover the display unit 302 in a surrounding manner, the electrode plates 304 mounted inside the frame, so that communication is possible without interrupting the screen of the display unit 302. In addition, by building up the frame to be convex with respect to the display face of the display unit 302 and then embedding the electrode plates 304 in the built-up portion so as to face inward, communication with the mobile device placed on the display unit 302 is possible. In this way, even in the configuration of FIG. 3B, communication with the mobile device 200 on the display unit 302 is possible. With the configuration of the electrode plates 304 as described above, when the electrode plates 304 are arranged on the rear face of the display unit 302 with the strengthened intensity of a reception signal, even if the display unit 302 is formed of a material through which it is difficult for radio waves to penetrate, communication is also possible via a constituent element such as liquid crystal.

Note that, since the mobile device 200 is relatively small, it is enough to provide, for example, one electrode plate 204 on the back face thereof, but a plurality of electrode plates 204 may also be provided.

Figure 4:
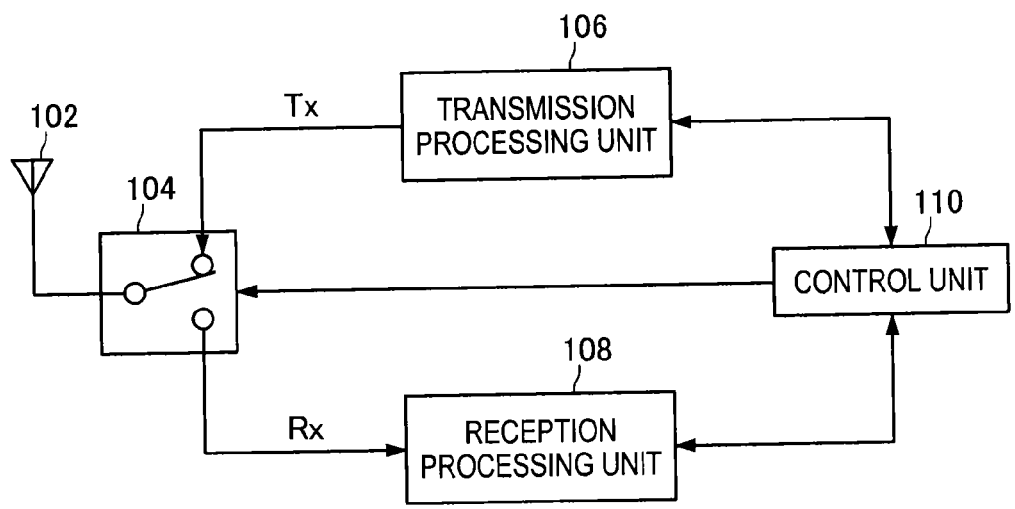
FIG. 4 is a schematic diagram illustrating a configuration of a communication device.

FIG. 4 is a schematic diagram for illustrating a configuration of a communication unit in the mobile device 200 and the information processing apparatus 300. The configuration shown in FIG. 4 is the same for both the mobile device 200 and the information processing apparatus 300.

As illustrated in FIG. 4, the mobile device 200 and the information processing apparatus 300 respectively have a transmission and reception coupler (communication units) 102, a selector 104, a transmission processing unit 106, a reception processing unit 108, and a control unit 110. Since the transmission and reception coupler 102 includes an electric field coupler, the transmission and reception coupler corresponds to the electrode plates 204 and 304 described above. The mobile device 200 and the information processing apparatus 300 perform communication by the transmission and reception couplers 102 by performing electric field coupling. The transmission and reception couplers 102 that the mobile device 200 and the information processing apparatus 300 respectively have are disposed so as to face each other, are separated by a short distance of, for example, about 3 cm, and can perform electrostatic coupling. Each transmission and reception coupler 102 is selectively connected to one of the selector 104, the transmission processing unit 106, and the reception processing unit 108.

The transmission processing unit 106 generates transmission signals for transmitting data from the transmission and reception coupler 102. The transmission processing unit 106 includes constituent elements such as an encoder that encodes transmission data, a spreader that spreads the transmission data, a mapper that extends the transmission data from a binary series to a complex number signal, and an RF circuit that performs up-conversion to a center frequency, or the like. In addition, the reception processing unit 108 performs decoding of a reception signal received in the transmission and reception coupler 102. The reception processing unit 108 includes constituent elements such as an RF circuit into which a reception signal is input, an AD converting section that converts the reception signal to a digital signal, a demapper that performs demapping for the reception signal, a decoder, or the like. When there is a transmission request made from an upper-level application, the transmission processing unit 106 generates a high-frequency transmission signal such as a UWB signal, or the like, based on transmission data, and propagates the signal from the transmission and reception coupler 102 to a communication counterpart device. The transmission and reception coupler 102, as the communication counterpart device, performs demodulation and decoding processes for the received high-frequency signal, and hands the reproduced data to the upper-level application. The same process is performed also when data is reversely transmitted between the mobile device 200 and the information processing apparatus 300. Therefore, bidirectional communication between the mobile device 200 and the information processing apparatus 300 is realized.

According to a communication scheme using a high frequency and wide band such as UWB communication, for example, it is possible to realize ultra-high rate data transmission of about several hundred Mbps within a short distance. In addition, when the UWB communication is performed not using radio wave communication but using electrostatic coupling, the intensity of a reception signal is inversely proportional to the fourth power of the distance, and thus, by suppressing the intensity of the reception signal (intensity of the radio wave) within the distance of 3 meters from radio facilities to a predetermined level or lower, a weak radio wave can be set which does not necessitate permission of a radio station, and accordingly, a communication system can be composed at a low cost. In addition, when data communication is performed in an ultra-short distance using the electrostatic coupling scheme, hacking on the transmission path can be reliably prevented without degrading the quality of signals caused by surrounding reflective objects, and accordingly, confidentiality can be secured. In addition, by suppressing the intensity of the reception signal to a predetermined level or lower so as to enable communication within a distance of only, for example, 3 cm, two devices can be configured to be unable to perform simultaneous communication for one device, and one-to-one communication in a short distance can be realized.

The control unit 110 controls the overall operations of the mobile device 200 and the information processing apparatus 300. For example, the control unit 110 controls the generation of a transmission signal by the transmission processing unit 106, and controls decoding of the reception signal by the reception processing unit 108. In addition, the control unit 110 outputs a switching signal to the selector 104 to cause the transmission and reception coupler 102 to be connected to the transmission processing unit 106 when a connection request frame, a data file, or the like is to be transmitted to the device on the communication counterpart side. In addition, when a connection request frame, a data file, or the like is awaited from the device on the communication counterpart side, the control unit 110 outputs a switching signal to the selector 104 to cause the transmission and reception coupler 102 to be connected to the reception processing unit 108.

The establishment of connection is realized in such a way that a connection request frame is transmitted from one device (initiator) to the other device (responder) and the initiator receives a connection response frame transmitted from the responder. Such a connection request frame is transmitted by a device into which a user action such as, for example, data file transfer, data file selection, or the like, is input to the communication counterpart.

Figure 5:
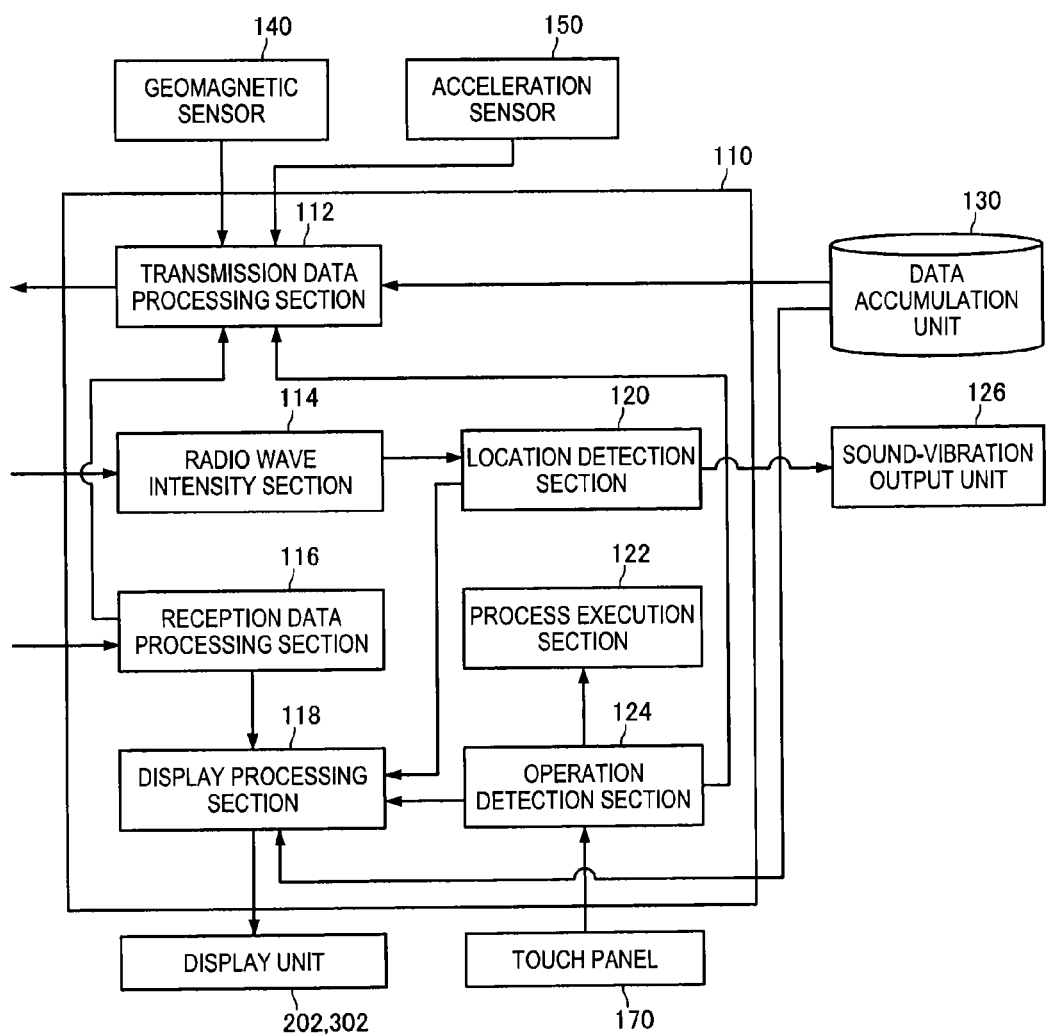
FIG. 5 is a block diagram showing a peripheral functional configuration of a control unit of a mobile device or an information processing apparatus.

FIG. 5 is a block diagram showing a peripheral functional configuration of the control unit 110 of the mobile device 200 or the information processing apparatus 300. The configuration shown in FIG. 5 is the same for both the mobile device 200 and the information processing apparatus 300. As illustrated in FIG. 5, the control unit 110 includes a transmission data processing section 112, a reception signal intensity (electric field intensity) detection section 114, a reception data processing section 116, a display processing section 118, a location detection section 120, a process execution section 122, an operation detection section 124, and a sound-vibration output section 126.

In addition, the mobile device 200 or the information processing apparatus 300 may include a data accumulation unit 130, a geomagnetic sensor 140, an acceleration sensor 150, the display unit 202 or 302, and a touch panel (touch sensor) 170. Note that the information processing apparatus 300 may not have the geomagnetic sensor 140 and the acceleration sensor 150.

The function blocks shown in FIGS. 4 and 5 can include hardware (a sensor, a circuit, or a memory), or an arithmetic processing unit (CPU) and software (a program) that causes the function block to function. When these function blocks include the arithmetic processing unit and software, the program can be stored in a recording medium such as a memory, or the like that the mobile device 200 or the information processing apparatus 300 includes.

With this configuration as above, the mobile device 200 and the information processing apparatus 300 perform various kinds of display as a user interface (UI) on the display units 202 and 302 when data is transmitted and received within the proximity of two devices to each other. Hereinafter, the details of such display will be described. Note that, in FIG. 1, the display unit 302 of the information processing apparatus 300 is disposed so as to stretch in the vertical direction, but the display unit 302 may be disposed in an upward facing state. In other words, when the information processing apparatus 300 includes a thin display panel, the apparatus may be disposed on a table so that the display unit 302 faces upward. In this case, wireless communication connection can be established by placing the mobile device 200 on the display unit 302.

In each embodiment to be described below, when the mobile device 200 and the information processing apparatus 300 perform wireless communication, it is possible to realize a user-friendly device that enables a user to instantly recognize and operate a process by performing predetermined display on the display units 202 and 302 as a user interface (UI). Note that the configurations above apply commonly to each embodiment.

In a first embodiment, a response when the mobile device 200 is placed on the display unit 302 of the information processing apparatus 300, or when the mobile device 200 is placed on a side of the information processing apparatus 200 will be described. Herein, the case in which the display unit 302 is mainly disposed facing upward will be described. Since the display unit 302 of the information processing apparatus 300 is sufficiently larger than the mobile device 200, a user can perform transmission and reception of data with the information processing apparatus 300 by placing the mobile device 200 on the display unit 302.

Figure 6:
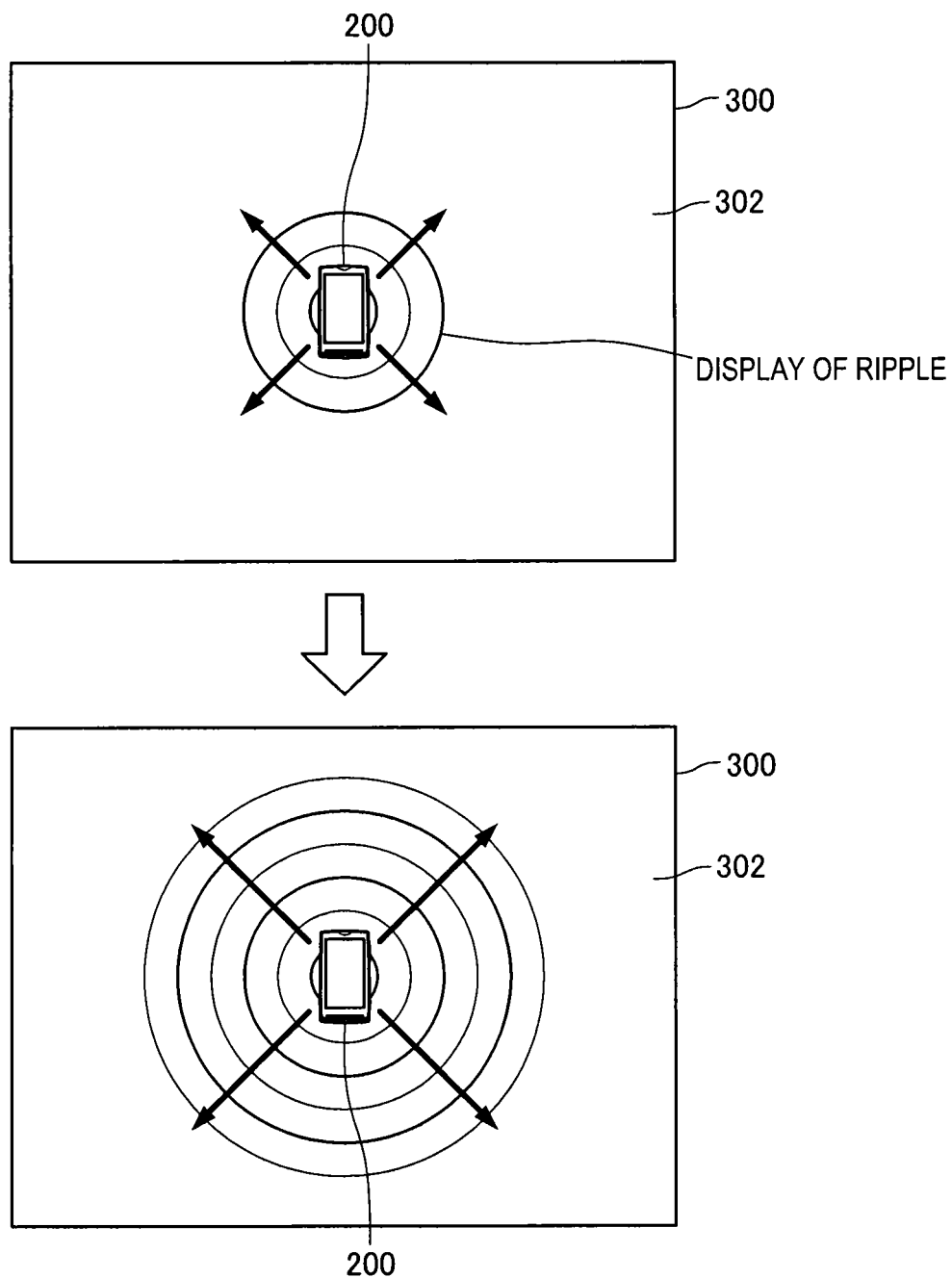
FIG. 6 is a schematic diagram showing a state in which a UI displays on a display unit such as waves (or ripple) around a mobile device is displayed on a display unit.

In the example illustrated in FIG. 6, when communication connection is established between the mobile device 200 and the information processing apparatus 300, a UI like a wave (ripple) is displayed around the mobile device 200 on the display unit 302. The wave displayed on the display unit 302 is displayed as if the wave outwardly propagates from the location of the mobile device 200 in a sequential manner. The shape of the wave is designed to change according to the data amount retained by the mobile device 200, radio sensitivity, the stage of data transfer, or the like. This information is acquired by the reception data processing section 116 of the information processing apparatus 300. The display processing section 118 of the information processing apparatus 300 executes a process for display as described in each embodiment below based on the information detected by the reception data processing section 116. Accordingly, the user can instantly recognize various kinds of data such as the retained data amount only by viewing the shape of the wave.

Next, a technique and a realization method for realizing the above-described UI will be described. In the case of the configuration illustrated in FIG. 6, the position of the mobile device 200 on the display unit 302 can be specified based on the intensity of a reception signal of each of the plurality of electrode plates 304 included in the information processing apparatus 300, and for example, when the intensity of a reception signal in a specific electrode plate of electrode plates 304 is stronger than the intensity of a reception signal in another electrode plate of electrode plates 304, the mobile device 200 is determined to be located close to the specific electrode plate of electrode plates 304. In addition, when the touch panel 170 is provided on the display unit 302, the location of the mobile device 200 on the display unit 302 can be specified based on an output of the touch panel 170. In this case, it is preferable to use a pressure-sensitive panel as a touch panel.

In addition, detection of holding the mobile device 200 on the information processing apparatus 300 is performed according to establishment of wireless connection based on proximity of the mobile device 200 and the information processing apparatus 300. First, when the transmission data processing section 112 of one device (initiator) transmits a connection request frame to the other device (responder), the reception data processing section 116 of the responder receives the connection request frame. Then, the transmission data processing section 112 of the responder transmits a connection response frame, and the reception data processing section 116 of the initiator receives the connection response frame. Accordingly, wireless connection between the mobile device 200 and the information processing apparatus 300 is established.

The mobile device 200 and the information processing apparatus 300 are specified by exchanging identification (ID)

information with each other after the establishment of connection. The data accumulation unit 130 of the mobile device 200 or the information processing apparatus 300 stores identification information, the identification information is read from the data accumulation unit 130, and then the information is transmitted to a connection destination by the transmission data processing section 112. As such identification information, in addition to device information that specifies the type of the device of the mobile device 200 or the information processing apparatus 300, information that contains personal information of the user and the device information may be used.

The intensity of a reception signal can be acquired from an RSSI (Received Signal Strength Indicator; reception signal intensity displaying signal). In the case of TransferJet, acquiring an RSSI during communication is included in the standard. The intensity of a reception signal is detected by the reception signal intensity (electric field intensity) detection section 114 shown in FIG. 5.

With regard to the amount of stored data, the type of data, or the like, after the establishment of wireless connection, information is searched for or an index is referred to. For example, the information processing apparatus 300 acquires information on contents, applications, and the like retained in the mobile device 200 by searching for the information after the establishment of wireless connection. In addition, the mobile device 200 can transmit the index of the information on the contents, applications, and the like to the information processing apparatus 300 after the establishment of wireless connection so as to cause the information processing apparatus 300 to acquire the information. In addition, search can be performed in the mobile device 200 and such an index can be transmitted from the information processing apparatus 300. In the same manner, even with regard to the capacity of data, after the establishment of wireless connection, information is searched for or an index is referred to. Information on the contents, applications, and the like retained in the mobile device 200 is transmitted from the transmission data processing section 112 and received by the reception data processing section 16.

The behavior of a UI to be realized is as follows. The location detection section 120 detects the location of the mobile device 200 on the display unit 302 or the edge of the display unit 302 based on the detection result of the intensity of the reception signal by the reception signal intensity (electric field intensity) detection section 114. The display processing section 118 performs a display process so that a UI of ripple is moved around the location at which the mobile device 200 is held. Accordingly, the ripple that widens outwardly is displayed around the mobile device 200 on the display unit 302. At this moment, the display processing section 118 provides a UI that the user can easily recognize by changing the behavior of the wave according to the type of the device, the intensity of the reception signal, the type of data, the capacity of data, and the like received by the reception data processing section 116.

For example, as the intensity of the reception signal increases, the wave is displayed so that the amplitude or the cycle of the wave becomes greater. Accordingly, the user can visually determine whether the intensity of the reception signal is strong or not by merely viewing the display of the wave on the display unit 302. In addition, by deciding in advance the shape, color, amplitude, cycle, and the like of the wave corresponding to the type of the device, the type of data, and the like, the user can visually recognize such information by merely viewing the display of the wave on the display unit 302.

Figure 7:
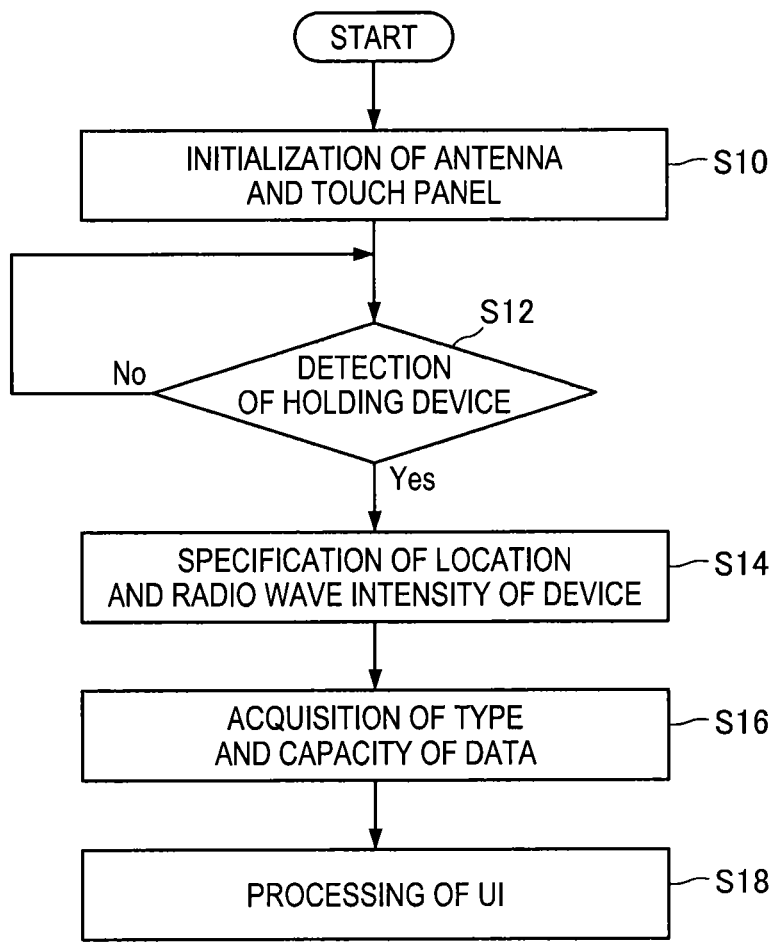
FIG. 7 is a flowchart for describing the procedure of a process in the information processing apparatus.

FIG. 7 is a flowchart for describing the procedure of a process in the information processing apparatus 300. First, in Step S10, the electrode plates (antennas) 204 and 304 and the touch panel 170 are initialized. Next, in the Step S12, the mobile device 200 detects holding thereof on the information processing apparatus 300, and when the mobile device 200 is held on the information processing apparatus 300, the process proceeds to Step S14. On the other hand, when the mobile device 200 is not held on the information processing apparatus 300, the process stands by in Step S12.

In Step S14, the location and the intensity of a reception signal of the mobile device 200 are specified. Next, in the Step S16, various kinds of information such as the type and capacity of data, and the like are acquired with reference information which is search for or an index which is referred to after the establishment of wireless connection. Next, in the Step S18, a process of a UI is performed, for example, a display process on the display unit 302 is performed by changing a display of ripple according to the intensity of the reception signal.

In Step S18, a process of changing the sound and the color of the wave is performed according to the type of the mobile device 200, as an example. In addition, a process of changing the amplitude and the cycle of ripple is performed according to the intensity of the reception signal. Further, a process of changing the sound and the color of the wave is performed according to the type of data. Further, a process of changing the sound, the color, and the cycle of the wave is performed according to the capacity of the data. Herein, the capacity of the data can be set to be the amount of data of contents such as photos, moving images, and the like retained in the mobile device 200. Note that the procedure in each embodiment to be described below is performed in the same manner as in FIG. 7.

In addition, the UI displayed on the display unit 302 is not necessarily limited to ripple, and for example, a UI of reading the title of a connected device in a specific voice may be possible according to the type of the device. In this case, the voice used in a commercial advertising the connected mobile device 200, or the like may be used.

In addition, with regard to the intensity of a reception signal, when the mobile device approaches a target displayed on the display unit 302 of the information processing apparatus 300, a display process can also be performed in such a way that the target is enlarged according to an increase in the intensity of the reception signal. The same process can also be expressed in a voice, and as the mobile device 200 approaches, a process of increasing the volume of the voice can also be performed.

Figure 8A:
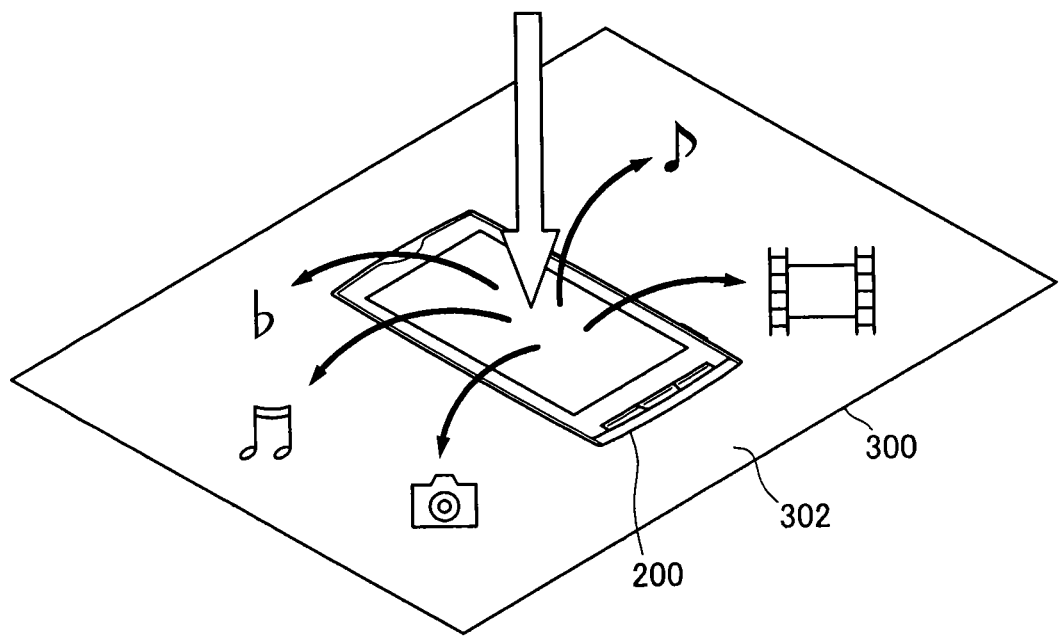
FIG. 8A is a schematic diagram showing an example in which, when the mobile device is placed, contents are displayed as if the contents are scattered in the periphery of the device using images jumping out therefrom.

FIG. 8A is a schematic diagram showing an example in which, when the mobile device 200 is placed, contents are displayed as if the contents are scattered in the periphery of the device using images jumping out therefrom. With regard to the types of data, after the mobile device 200 is held, a display process can be performed showing as if icons corresponding to the types of data are jumping out from the center of the mobile device, as illustrated in FIG. 8A. In this case, if the contents are music, for example, a display process showing notes scattering outside is performed, or if the contents are photos, a display process showing photos scattering outside is performed. At this moment, better visual effects can be exhibited using 3-dimensional display.

Figure 8B:
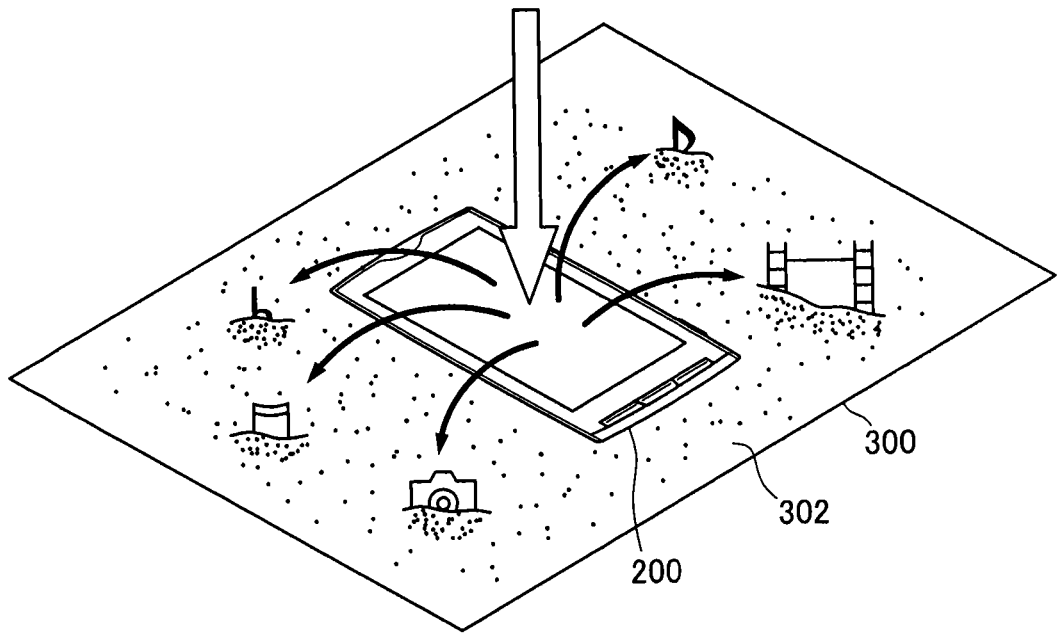
FIG. 8B is a schematic diagram showing an appearance in which UIs are displayed on the display unit as if the UIs are dropped on the sand and sunken therein around the mobile device.

FIG. 8B is a schematic diagram showing a state in which UIs are displayed on the display unit as if the UIs are dropped on the sand and sunken therein around the mobile device 200. As illustrated in FIG. 8B, the display unit 302 is likened to a bunker in a golf course, and contents are displayed as if the contents are scattered in the periphery using an image that seems as if balls are dropped in the bunker and the sand flies. With regard to transfer of the capacity of data, the display unit 302 is likened to a bunker in a golf course, and the contents are displayed as if the contents are scattered and sunken around the mobile device 200 using an image that seems as if balls are dropped in the bunker. Further, according to the size of the data, display is performed as if the depth of sinking changes. In the same manner, UIs may be displayed being likened to a cushion with respect to the display unit 302. In this case, the quantity of bound is changed according to the data amount of contents, and display can be performed so that the quantity of bound increases as the data amount increases.

Next, a case in which the mobile device 200 is held on a side of the display unit 302 (display) of the information processing apparatus 300 will be described. This example applies to the case in which the electrode plates 304 are provided along the perimeter of the display unit 302 as described in FIG. 3.

As illustrated in FIG. 9, when the mobile device 200 is brought close to a side of the information processing apparatus 300, wireless communication connection is established between the electrode plates 304 provided along the perimeter of the information processing apparatus 300. In this case, a process of displaying semi-circular ripple around the location at which the mobile device 200 is held is performed. Further, it is also possible to display icons and the like corresponding to the type of the mobile device 200 at the center or the periphery of the wave. Accordingly, the user can ascertain whether the held mobile device 200 has been correctly recognized by the information processing apparatus 300 or not. Other processes can be performed in the same manner as in the example of FIG. 6, and the amplitude, cycle, color, and the like of the ripple can be changed according to the intensity of the reception signal, the type of data, the capacity of data, and the like.

Figure 10:
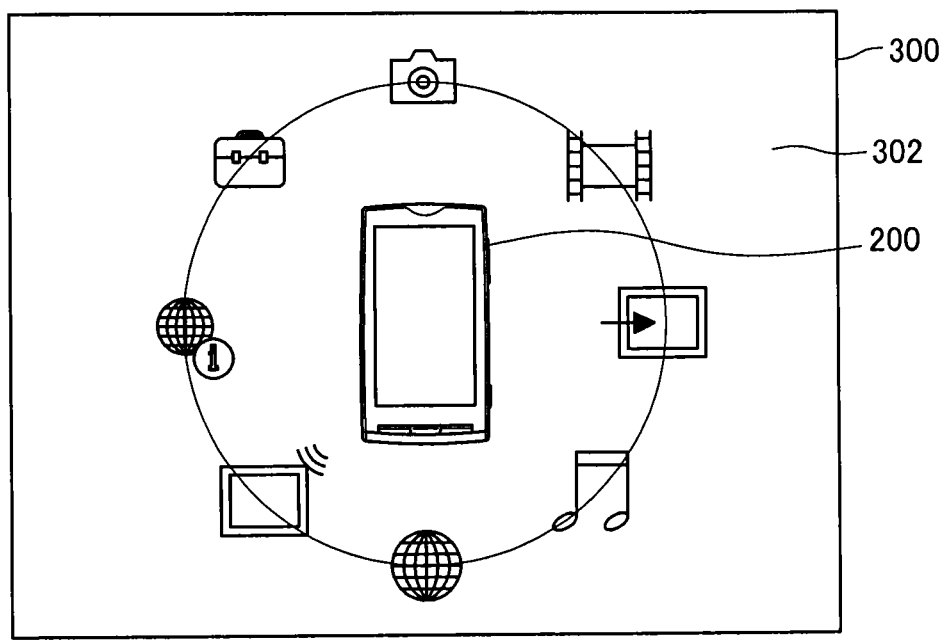
FIG. 10 is a schematic diagram showing a state in which, when the mobile device is placed on the display unit of the information processing apparatus, contents or menus are displayed thereon.

Next, a configuration of performing menu display when the mobile device 200 is placed on the display unit 302 will be described. FIG. 10 is a schematic diagram showing a state in which, when the mobile device 200 is placed on the display unit 302 of the information processing apparatus 300, contents or menus transmitted from the mobile device 200 are displayed thereon. As illustrated in FIG. 10, the mobile device 200 and the information processing apparatus 300 perform communication, and contents and menus are displayed in the periphery of the mobile device 200. The example illustrated in FIG. 10 shows a state in which contents retained in the mobile device 200 are displayed on a circumference around the mobile device 200 on the display unit 302. Using such display, it is possible to perform a process of retrieving the contents and the like by the user operating the icons of the contents displayed on the display unit 302. In this case, an output of the touch panel 170 is transmitted to the operation detection section 124, and then a process of displaying the contents retrieved by the display processing section 118 is performed. Further, an output of the operation detection section 124 is transmitted to the process execution section 122, and a process of retrieving the contents is executed.

When the user operates the icon of a "camera" displayed on the display unit 302, the touch panel 170 of the information processing apparatus 300 detects the operation, and data of photos is displayed as content thereon. Accordingly, the data of photos retained in the mobile device 200 is displayed on the display unit 302.

A technique and a realization method necessary for realizing the UIs shown in FIG. 10 will be described below. "Specification of the location of the mobile device 200," "detection of holding," and "establishment of wireless connection" are performed in the same manner as in the example of the ripple described above. In addition, in the UIs shown in FIG. 10, the information processing apparatus 300 acquires not only information indicating the size of the mobile device 200, but also information specifying the orientation of the mobile device 200 when the mobile device 200 is specified. This makes it possible to display icons on the outer side of the mobile device 200 by acquiring the information on the size of the mobile device 200. In addition, the information on the orientation of the mobile device 200 is acquired in order to match the orientation for displaying the icons with that of the mobile device 200. When the orientation of the mobile device 200 is specified, the touch panel 170 of the information processing apparatus 300 detects the shape of the mobile device 200, and then specifies the orientation thereof based on the detection. In addition, it is also possible to transmit information on the direction of the mobile device 200 to the information processing apparatus 300 which is obtained from the geomagnetic sensor 140 of the mobile device 200.

Note that the above configuration can be applied to the case in which the mobile device 200 is placed on the display unit 302 and the case in which the mobile device 200 is placed on a side of the display unit 302, and the location at which the mobile device 200 is placed is set not to be limited.

Display of the menu screen of the information processing apparatus 300 displays the icons indicating the functions of the mobile device 200 on the circumference of the concentric circle sharing the same center as the mobile device 200 illustrated in FIG. 10. When the mobile device 200 is placed on the side of the information processing apparatus 300, the icons are displayed on the circumference of a semi-circle having the mobile device 200 as the center.

The process performed by the information processing apparatus 300 in the example of FIG. 10 is the same as in FIG. 7. In the example of FIG. 10, in Step S16, information on the contents, the size of the mobile device 200, and information on the orientation of the mobile device 200 are acquired, in addition to information on the type of data, and the like. Then, in Step S18, the contents and the menus are displayed in consideration of the size and the orientation of the mobile device 200.

Figure 11:
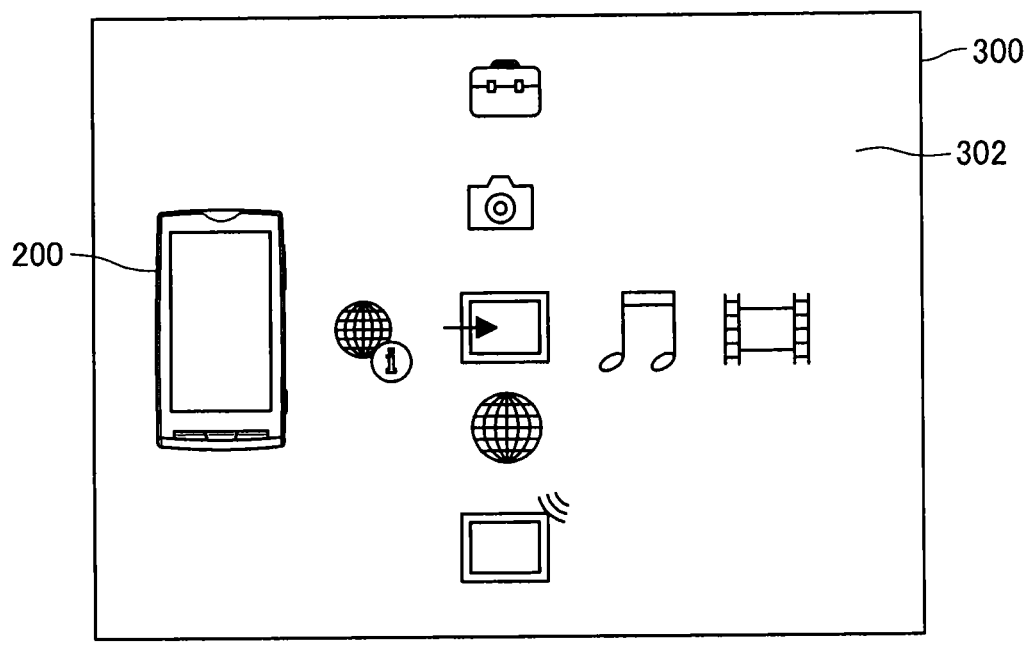
FIG. 11 illustrates an example in which, when connection with the mobile device is established, contents retained in the mobile device are displayed in the item of XrossMediaBar (XMB).

FIGS. 11 to 17 show variations of FIG. 10. FIG. 11 illustrates an example in which, when connection with the mobile device 200 is established, the contents retained in the mobile device 200 are displayed in the item of XrossMediaBar (XMB, a registered trademark). In this case, when one icon arranged in the horizontal direction is selected, icons of contents pertaining to the selected icon are displayed in the vertical direction. In this manner, it is also possible that, when a function icon is selected, contents corresponding thereto are set to be displayed.

Figure 12:
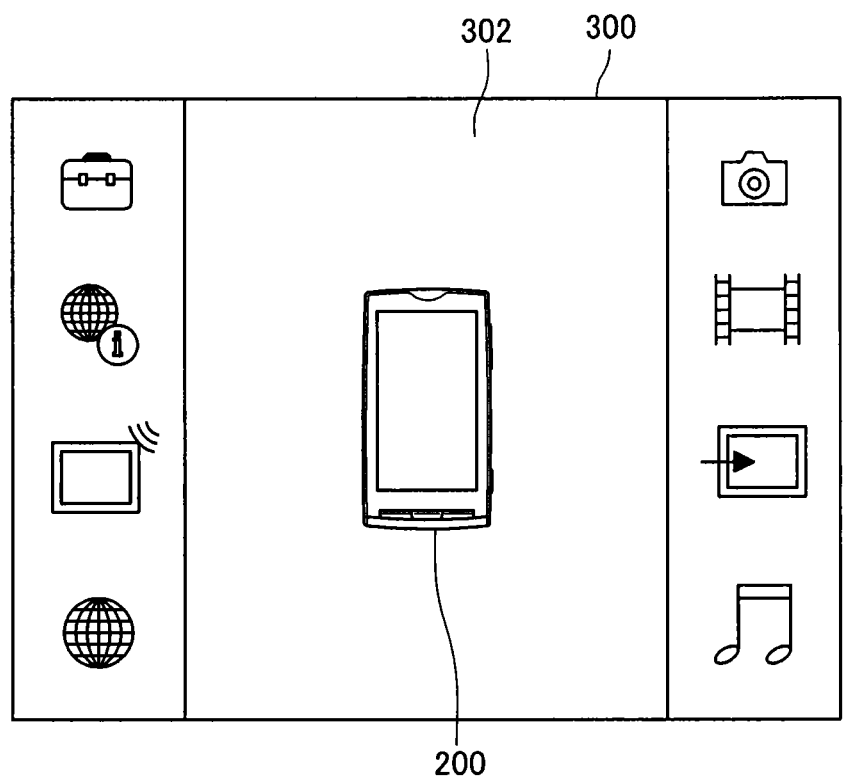
FIG. 12 is a schematic diagram showing an example in which information on the contents is divided between the right and left sides of the display unit for display.

FIG. 12 illustrates an example in which information on the contents is divided between the right and left sides of the display unit 302 for display. In addition, FIG. 13 illustrates an example in which, when the information processing apparatus 300 is connected to the mobile device 200 in the state in which icons of contents relating to the information processing apparatus are displayed on the display unit 302, display is performed in a manner that, among the function icons, those that are unavailable are grayed out and those that are available are brightly displayed according to the functions of the mobile device 200. In addition, when the mobile device 200 is held, it may be possible to set, among the function icons, those that are not available not to be displayed and those that are available to be displayed. In this case, it may be possible to display an animation during the display. Further, it may be possible to set recommended function icons to appeal.

Figure 14:
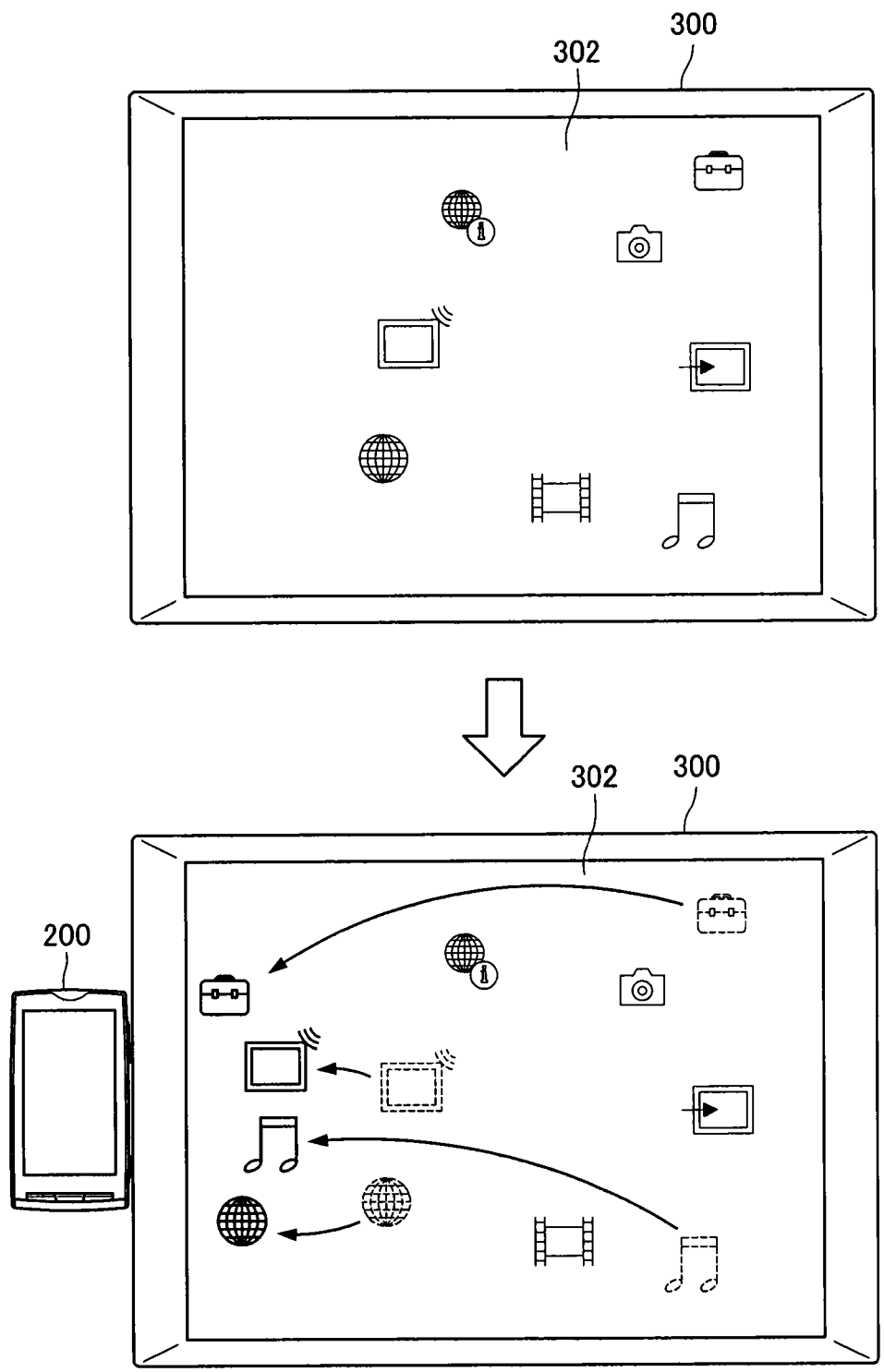
FIG. 14 is a schematic diagram showing a state in which the available icons are moved close to the mobile device.

FIG. 14 is a schematic diagram showing a case in which the mobile device 200 is brought close to the left side of the information processing apparatus 300. In the example of FIG. 14, the available icons are moved around the mobile device 200. In this manner, when the mobile device 200 is held, it may also be possible to move the available function icons among the function icons as if the icons are drawn to the mobile device 200. In this case, the unavailable function icons may be grayed out or may not be displayed. At this moment, after the information on the size and the orientation of the mobile device 200 is acquired, the icons are displayed so as not to overlap the mobile device 200. Further, it may also be possible to set the flow of data to be visually recognized by making the movement direction or the icons coincide with the transfer direction of the data. Further, it may also be possible to display the icons by combining relevant icons. Moreover, it is possible to move an icon that moves in a wrong direction in a correct direction by operating the touch panel 170. Owing to the wide use of the mobile device 200, such a mobile device 200 having various kinds of contents and applications has been introduced. According to the present embodiment, it is possible to lucidly present available functions and unavailable functions of the mobile device 200 by merely placing the mobile device 200 on a large display, whereby convenience of users including those who are not familiar with handling of the mobile device 200 can be enhanced.

Figure 15:
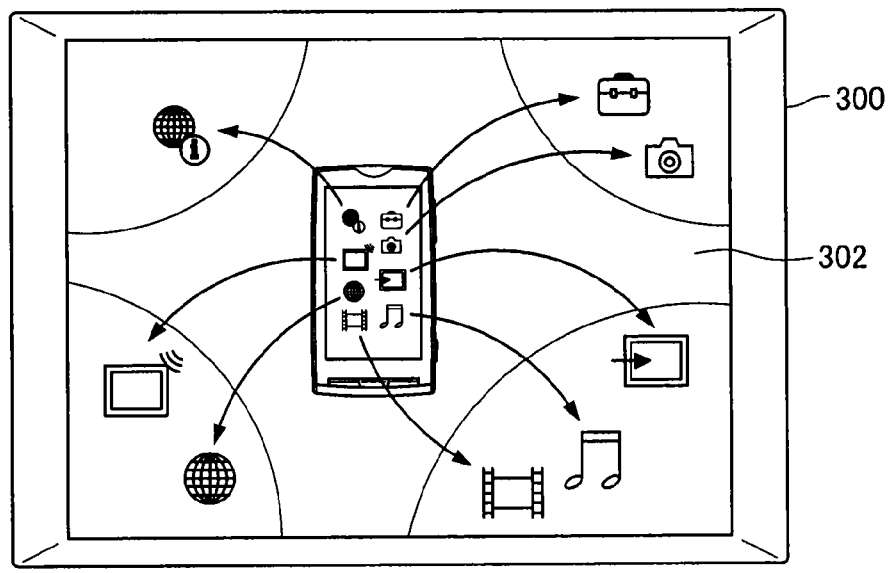
FIG. 15 is a schematic diagram showing an example in which contents of the mobile device are moved to the four corners on the display unit.

FIG. 15 illustrates an example in which the contents of the mobile device 200 are moved to the four corners of the display unit 302 according to the kinds of the contents. In this manner, it may be possible to collect the icons of the contents in different places according to the kinds of the contents. The reception data processing section 116 of the information processing apparatus 300 can acquire identification information of information received from the mobile device 200 and the display processing section 118 can perform a display process according to the kinds of the contents. Accordingly, it is possible to classify and then display the contents of various kinds in an orderly manner. In addition, it is also possible to search for the content of a function that the user desires by moving the contents using the touch panel operation 170.

Figure 16:
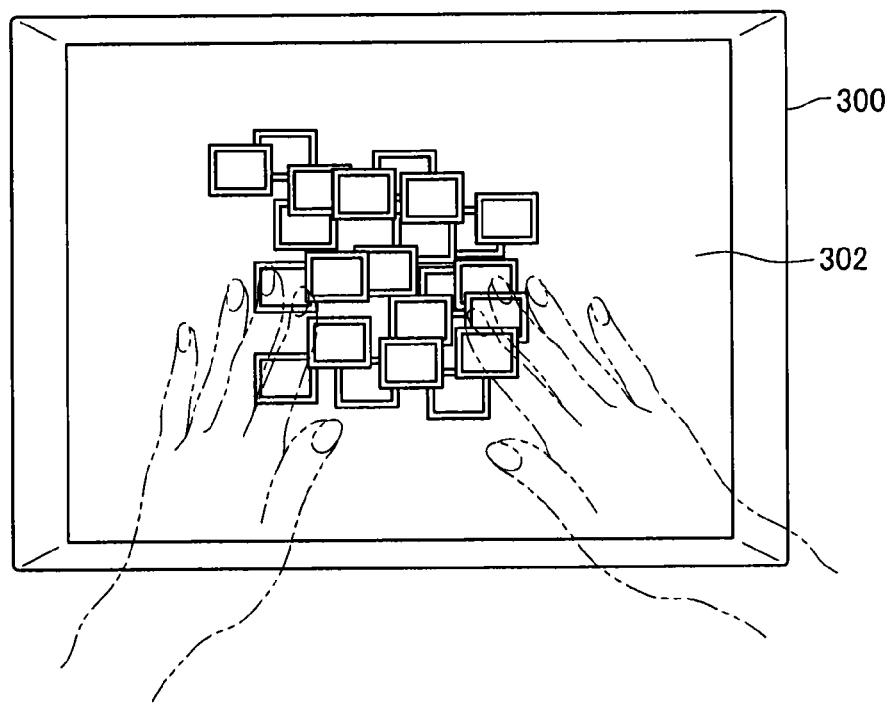
FIG. 16 is a schematic diagram showing a state in which contents flowing over from the mobile device to the display unit are searched by browsing by hand.

FIG. 16 illustrates a state in which, when the mobile device 200 is held on the information processing apparatus 300, the contents flow over from the mobile device 200 to the display unit 302 and then the flowing contents are searched by browsing by hand. By the operation detection section 124 detecting an operation of the touch panel 170 by the user, it is possible to perform a display process for an appearance of the contents that move according to the operation. In this manner, it is possible to perform an operation of searching for desired contents by randomly displaying contents in an overlapping manner and moving the contents by hand.

It is also possible to perform 3-dimensional display and to operate the overlapping contents with 3-dimensional operations in the display method of FIG. 16. In this case, it is possible to realistically display the appearance of the overlapping contents.

With the operation of FIG. 16, when the contents are "photos," for example, it is possible to find a desired photo or array the photos from a state as if the photos are scattered on the display unit 302. Accordingly, from the randomly disposed contents, it is possible to find desired contents by browsing the contents by hand for the operation of the touch panel 170. At this moment, display can be performed by putting priority on contents having a large number of reproductions or contents having a small number of reproductions.

Figure 17:
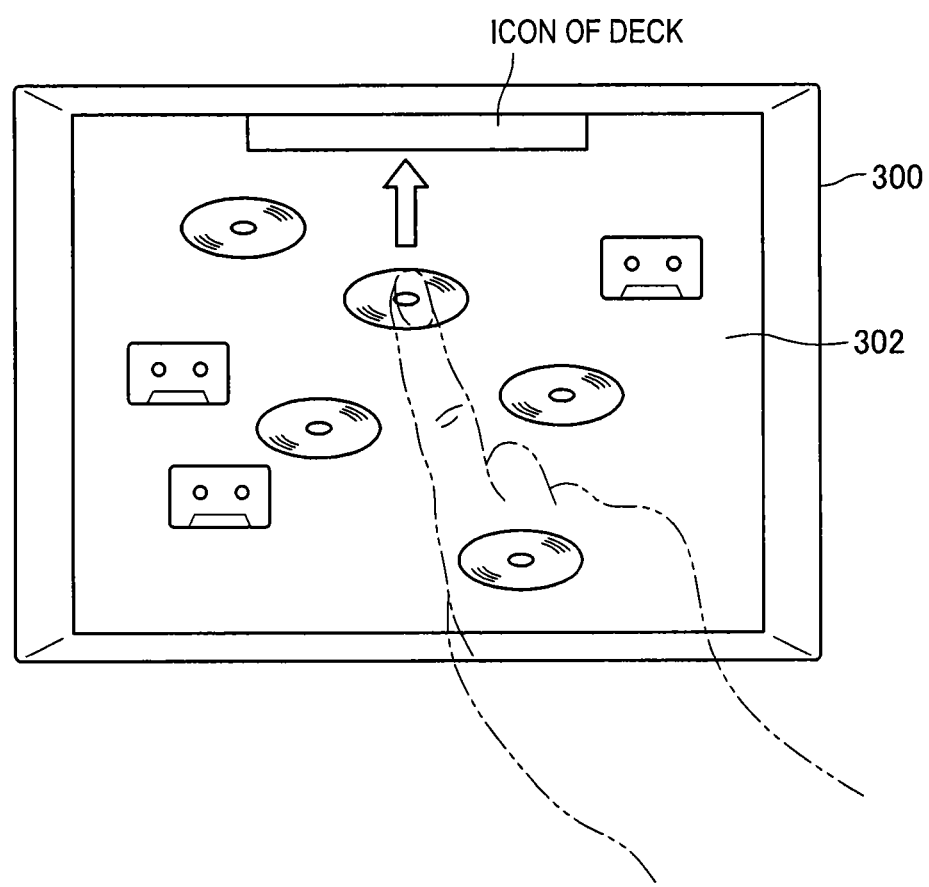
FIG. 17 is a schematic diagram showing a state in which a UI expressed by icons depicting compact discs (CDs) and audio tapes and a UI expressed by depicting a player are displayed.

FIG. 17 is a schematic diagram showing another operation for the contents. In the example illustrated in FIG. 17, Ms expressed by icons depicting compact discs (CDs) or audio tapes and UIs depicting a player are displayed. When the user overlaps an icon of the player with an icon of a CD through an operation of the touch panel 170, the selected CD is reproduced by the process execution section 122.

As means for creating a playlist, it is possible to set data in which the order of contents is set on the playlist using a technique of arranging the contents (in the example of FIG. 17, CDs and audio tapes) in the order of the list or giving numbers to the contents. Thus, even if compact disks are randomly put into a player, reproduction can be attained in the right order. Generally, since large-sized PCs are equipped with good audio and video reproduction devices, the contents of the mobile device 200 can be viewed and listened to using a good reproduction device while being visually recognized and selected on a large-sized display (or the display unit 302).

Next, methods for acquiring the data of the icons include methods for preparing selection options in advance and displaying the icons of relevant functions after searching for the function on a terminal side, but are not limited thereto.

As an application example of shifting a process on the mobile device 200 to the information processing apparatus 300, a state of the mobile device 200 is acquired by the information processing apparatus 300 and a continuation thereof is reproduced on the information processing apparatus 300. When the mobile device 200 is held, (the continuation) of contents that have been reproduced in the mobile device 200 is reproduced on the information processing apparatus 300. In addition, images, or the like, may be transmitted from the screen of another information processing apparatus 300 under operation.

Next, an example will be described in which, when the mobile device 200 is held, contents, function icons, and the like on the information processing apparatus 300 already displayed on the display unit 302 are moved. In the example illustrated in FIG. 18, if the mobile device 200 is placed on the display unit 302 when a window W of the contents is displayed on substantially the entire face of the display unit 302, the window W is moved (reduced) so as to avoid the mobile device 200. At this moment, the window W is resized according to the size of the mobile device 200. Accordingly, the user can visually recognize the entire display of the window W in a continuous manner without overlapping the mobile device 200 and the window W.

Figure 18:
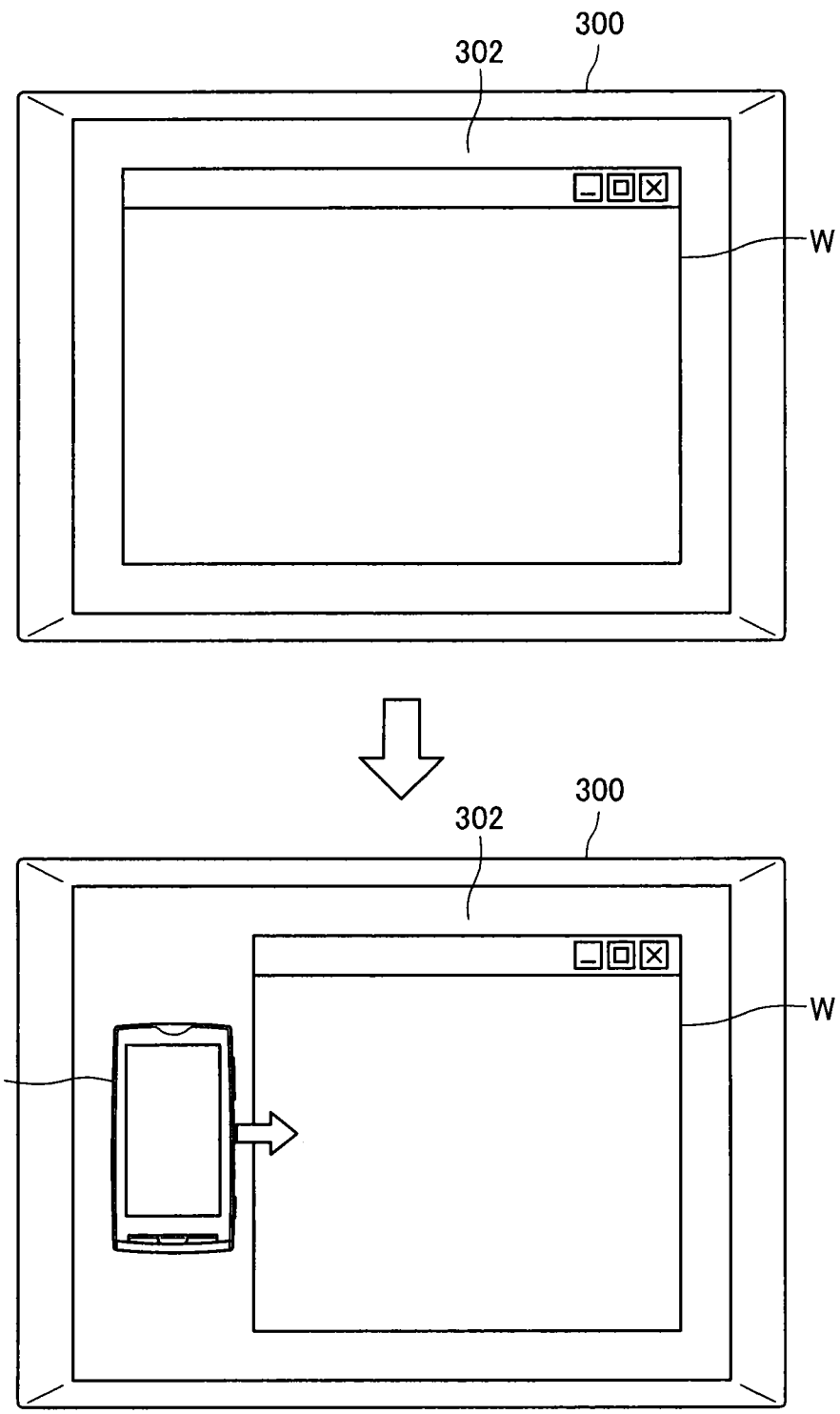
FIG. 18 is a schematic diagram showing an example in which a window W is moved (reduced) out of the way of the mobile device.

FIG. 19 is a schematic diagram showing an example in which icons are moved so as to avoid the mobile device 200 when the mobile device 200 is placed over the icons that are already displayed. It is possible to avoid overlapping the mobile device 200 and the icons by moving the icons to conspicuous places which otherwise would be placed beneath the mobile device 200. Then, with an operation of the touch panel 170, relevant icons can be arranged so as to be easily used. In the examples of FIGS. 18 and 19, by acquiring the location, the size, and the orientation of the mobile device 200 after the establishment of connection, the display processing section 118 performs a process of moving the window or the icons to a location at which the mobile device 200 is not overlapped. It is possible to provide convenience for the user by enabling the user to easily place the mobile device 200 for display of the menu, or the like, without causing the user to worry about the position of the window. With regard to FIG. 18, when the mobile device 200 is separated from over the display unit 302, the window W may be designed to return to the size before the mobile device 200 is placed thereon. In the same manner, with regard to FIG. 19, when the mobile device 200 is separated from over the display unit 302 after icons overlapped by the mobile device 200 are moved or deleted, the icons may be designed to be re-moved to or re-displayed at the original position thereof.

In addition, when the mobile device 200 is rotated, the menu displayed on the display unit 302 is rotated according to the orientation of the device. When there is another user other than the user operating the mobile device 200, for example, a menu facing the direction of the user operating the mobile device 200 is made to face the direction of the former user by rotating the mobile device 200. Accordingly the orientation of display can be changed so that the former user can easily see the display. An instant operation is possible since the menu on the display can be operated with direct contact with the (physical object of) mobile device 200 as momentum.

Figure 20:
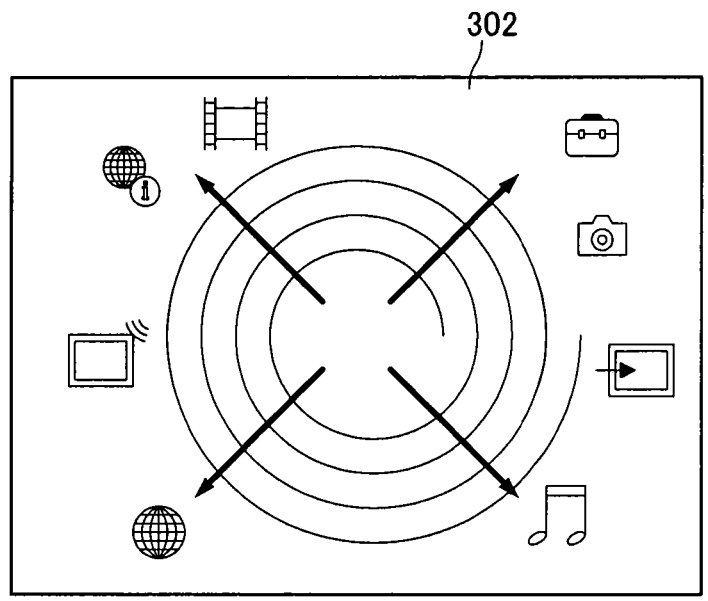
FIG. 20 is a schematic diagram showing a state in which a spiral UI is displayed according to the position of the mobile device.
Figure 21:
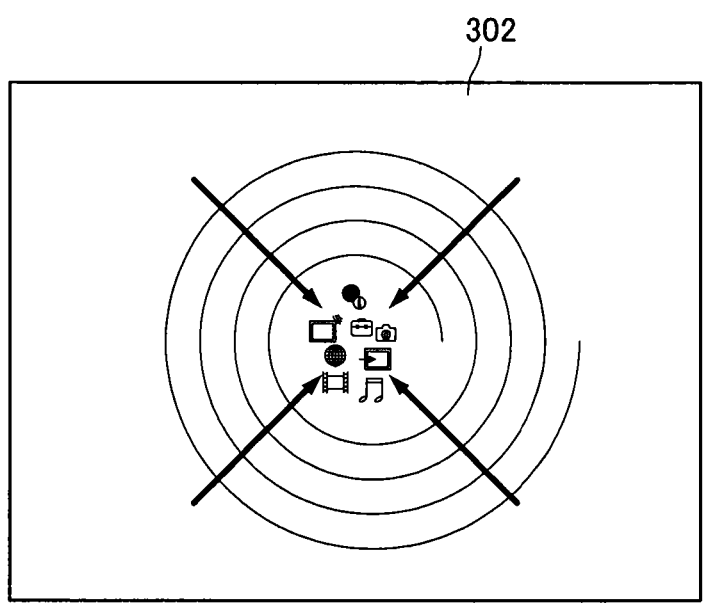
FIG. 21 is a schematic diagram showing a state in which another spiral UI is displayed according to the position of the mobile device.

Next, a case in which the mobile device 200 is brought close to the back face of the information processing apparatus 300 will be described. In the case of the configuration shown in FIG. 2, the electrode plates 304 are arranged over the entire back face of the information processing apparatus 300, and thus connection can be established even when the mobile device 200 is brought close to the back face of the information processing apparatus 300. In this case, a spiral UI is displayed on the display unit 302 according to the position of the mobile device 200 as illustrated in FIGS. 20 and 21. At this moment, the user can visually and instantly recognize the movement direction of data with the traveling direction of waves changed along the movement direction of the data. Although display on the display unit 302 can be made in the same manner as in the example of FIG. 6, since the mobile device 200 is not present on the display unit 302, such a spiral UI or the like can also be displayed from the center point at which the mobile device 200 is located, without considering the size of the mobile device 200.

Figure 22:
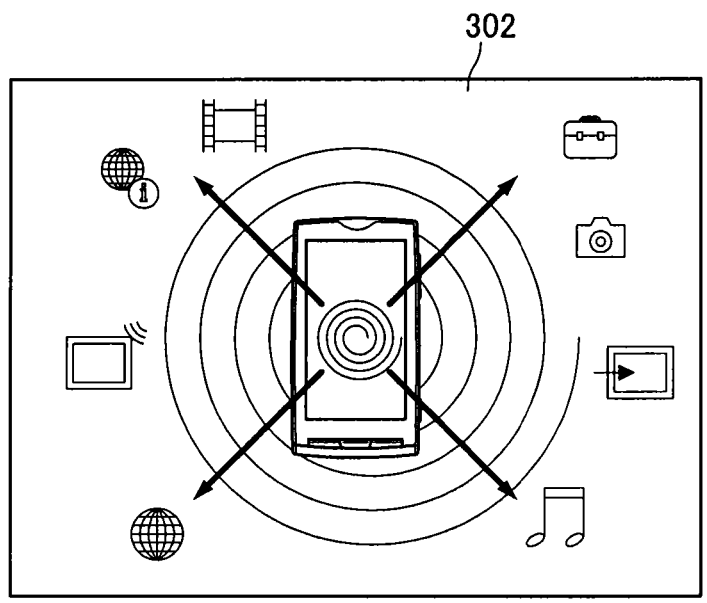
FIG. 22 is a schematic diagram showing a state in which the display unit of the mobile device and the display unit of the information processing apparatus perform display in an interlocking manner.
Figure 23:
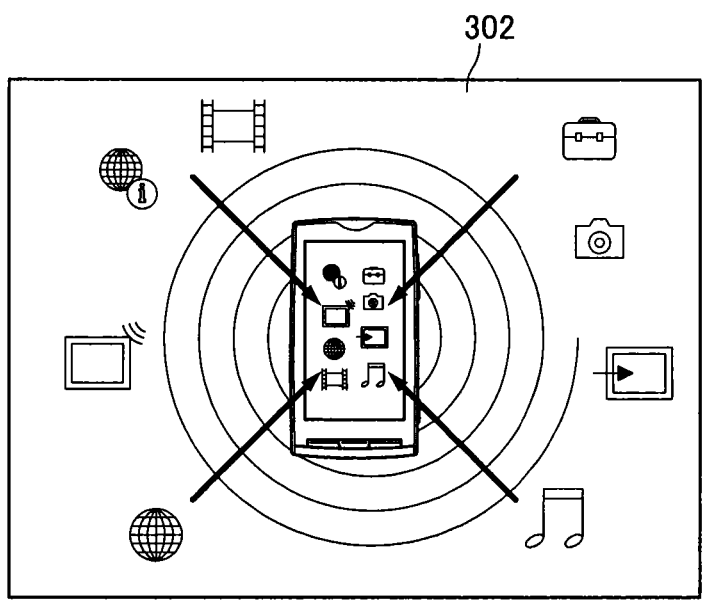
FIG. 23 is a schematic diagram showing another state in which the display unit of the mobile device and the display unit of the information processing apparatus perform display in an interlocking manner.

FIGS. 22 and 23 relate to providing UIs for informing the user of the movement directions of data by performing display on the display unit 202 of the mobile device 200 and the display unit 302 of the information processing apparatus 300 in an interlinked manner when the mobile device 200 is placed on the display unit 302. Specifically, when data is transferred from the mobile device 200 to the information processing apparatus 300 as illustrated in FIG. 22, if the mobile device 200 is held, the display unit 202 displays movements, for example, as if the contents are sucked into the spiral. Then, the display unit 302 of the information processing apparatus 300 displays UIs in which the contents absorbed in the mobile device 200 flow over. In this case, if the transmission processing section 112 of the mobile device 200 transmits data, the display processing section 118 of the mobile device 200 performs a display process on the display unit 202 as if the contents are sucked into the spiral. When data is transferred from the information processing apparatus 300 to the mobile device 200, a display process is performed in a reverse manner to the above, and thus an appearance of the contents being sucked into the spiral is displayed on the display unit 302 of the information processing apparatus 300 and an appearance of the contents flowing over is displayed on the display unit 202. By expressing the transfer of the contents projected on two displays of the information processing apparatus 300 and the mobile device 200, it is possible to lucidly convey the situation of content transfer to the user.

Note that menus or contents can also be displayed on a display of a mobile device of the related art, but a miniaturized mobile device has a small display unit, and thus it is sometimes difficult to grasp or operate the list of a number of large-capacity menus or contents within the mobile device.

As described in the embodiment, it is possible to dramatically enhance user convenience by once projecting the menu and contents of the mobile device 200 on the display unit 302 as a larger display and causing the user to operate them. In addition, the contents of the mobile device 200 possessed by an individual can be viewed by another person through a large-sized display, which facilitates communication regarding the contents of the mobile device 200. Further, it is possible to operate and manage contents even using the mobile device 200 that is unable to secure a sufficiently large display unit (or does not have a display unit).

As a merit of placing the mobile device 200 on the display unit 302 (or on a display), a menu, or the like can be displayed, which is triggered by an extremely instantaneous operation of "placing (or moving) the mobile device 200," and thus user convenience of operating the device can be enhanced. In addition, as a merit of placing the mobile device 200 on a side portion of the display unit 302 (a flank of the display), the menu, or the like can be displayed without shielding the large-sized display with the mobile device 200 itself. In addition, as a merit of handling contents of two mobile devices 200 via the information processing apparatus 300, synchronization or the progress, degree, current state, or the like of movement of contents between two mobile devices 200 is projected on the information processing apparatus 300 having a large-sized display, and thus the state of content movement and sharing can be lucidly shown to users thereof in a visual manner.

2. Second Embodiment

Next, a second embodiment of the present invention will be described. The second embodiment relates to movement of contents between the mobile device 200 and the information processing apparatus 300. The movement of contents includes movement of contents from the mobile device 200 to the information processing apparatus 300 and movement of contents from the information processing apparatus 300 to the mobile device 200.

When contents are moved from the mobile device 200 to the information processing apparatus 300, if the mobile device 200 is placed on the display unit 302 of the information processing apparatus 300, the content of the mobile device 200 is moved to the information processing apparatus 300. In this case, when the contents are a moving image and the moving image is under reproduction on the display unit 202 of the mobile device 200, the content of the moving image moved to the information processing apparatus 300 is reproduced on the display unit 302 from the time point of the continuation being reproduced.

In addition, by providing a plurality of places for placing the mobile device 200 on the display unit 302, different operations or data transfers can be performed depending on the places. In this case, based on a location detection result of the mobile device 200 by the location detection section 120 of the information processing apparatus 300, different operations or data transfers are performed. In a case in which a plurality of contents are moved to the information processing apparatus 300 but being unable to be displayed on the entire display unit 302, or the like, the contents are displayed as if overlapping and accumulating.

In addition, when contents are moved from the information processing apparatus 300 to the mobile device 200, the content of the information processing apparatus 300 is transferred to the mobile device 200 by holding the mobile device 200 on the information processing apparatus 300. In this case, the information processing apparatus 300 displays the contents to be transmitted on the display unit 302, and the contents are set to be transmitted to the mobile device 200 when the mobile device 200 is held thereon. In addition, it may be set that one or a plurality of places accumulating contents to be transmitted are provided within the display unit 302 and when the mobile device 200 is held on the places, the contents are absorbed thereinto together. These processes are realized by the mobile device 200 absorbing the contents when the location of the mobile device 200 is detected by the location detection section 120 of the information processing apparatus 300 and when it is ascertained by the display processing section 118 that the location of the contents displayed on the display unit 302 coincides with the location of the mobile device 200.

In addition, a plurality of mobile devices 200 are connected to the information processing apparatus 300, and the contents are visually moved via the information processing apparatus 300. Each mobile device 300 is placed on the display unit 302 or disposed on a side of the information processing apparatus 300. For example, the plurality of mobile devices 200 are disposed on the right and left sides of the information processing apparatus 300, and the contents are moved from the mobile devices 200 on one side to the mobile devices 200 on the other side via the information processing apparatus 300. In this manner, it is possible for a plurality of users to view and move the contents via the information processing apparatus 300.

Next, data transfer using a flick operation (an operation of lightly shaking) of the mobile device 200 will be described. In the examples described above, data transfer is set to be automatically performed in the held state (after the establishment of connection), but in this example, if contents displayed on the mobile device 200 are flicked in the state in which the mobile device 200 is held on the information processing apparatus 300 as illustrated in FIG. 24, data is transferred to the information processing apparatus 300. With regard to the flicking operation, the mobile device 200 itself may be flicked or the touch panel 170 may be flicked on the display unit 302 of the mobile device 200. In the same manner, if contents displayed on the display unit 302 of the information processing apparatus 300 are flicked toward the mobile device 200 with an operation of the touch panel 170 on the display unit 302, data is transferred to the mobile device 200. The flicking operation on the touch panel 170 can be detected by the operation detection section 124 based on an output of the touch panel 170. In addition, when the mobile device 200 itself is flicked, the operation can be detected based on an output of the acceleration sensor 150 included in the mobile device 200. When such a flicking operation is detected, the transmission data processing section transmits data of the contents or the like to the communication counterpart device.

Further, in FIG. 24, in addition to the case of flicking the mobile device 200 itself on the display unit 302, if contents on the display unit 202 of the mobile device 200 are moved in a predetermined direction (for example, a data transferring direction shown in FIG. 24) by a touch of a user, the contents can be set to be moved and displayed on the display unit 302 in the direction, in the same manner as in the case of flicking the mobile device 200 itself. In this case, information on content selection on the mobile device 200 and the flicking direction by a finger of the user is detected by the touch panel of the mobile device 200, and by notifying the information processing apparatus 300 of the detected information, the contents can be moved in the same manner as in FIG. 24. Accordingly, while details of the contents to be moved are checked on the display unit 202 of the mobile device 200, it is possible to move the contents in an arbitrary direction on the large-sized display unit 302 so as to be displayed on the desktop, and to realize instant content movement with a sense of "scattering" the contents using a finger of the user.

Further, if contents under reproduction on the display unit 202 of the held mobile device 200 are flicked on the display of the information processing apparatus mobile device 200, it is possible to transfer the contents so that display is switched to reproduction display on the display unit 302 of the information processing apparatus 300. In the same manner, if contents under reproduction on the display unit 302 of the information processing apparatus 300 are flicked toward the mobile device 200 with an operation of the touch panel 170 of the display unit 302, it is possible to transfer the content under reproduction to the mobile device 200 and to switch to reproduction display on the display unit 202 of the mobile device 200.

Figure 25:
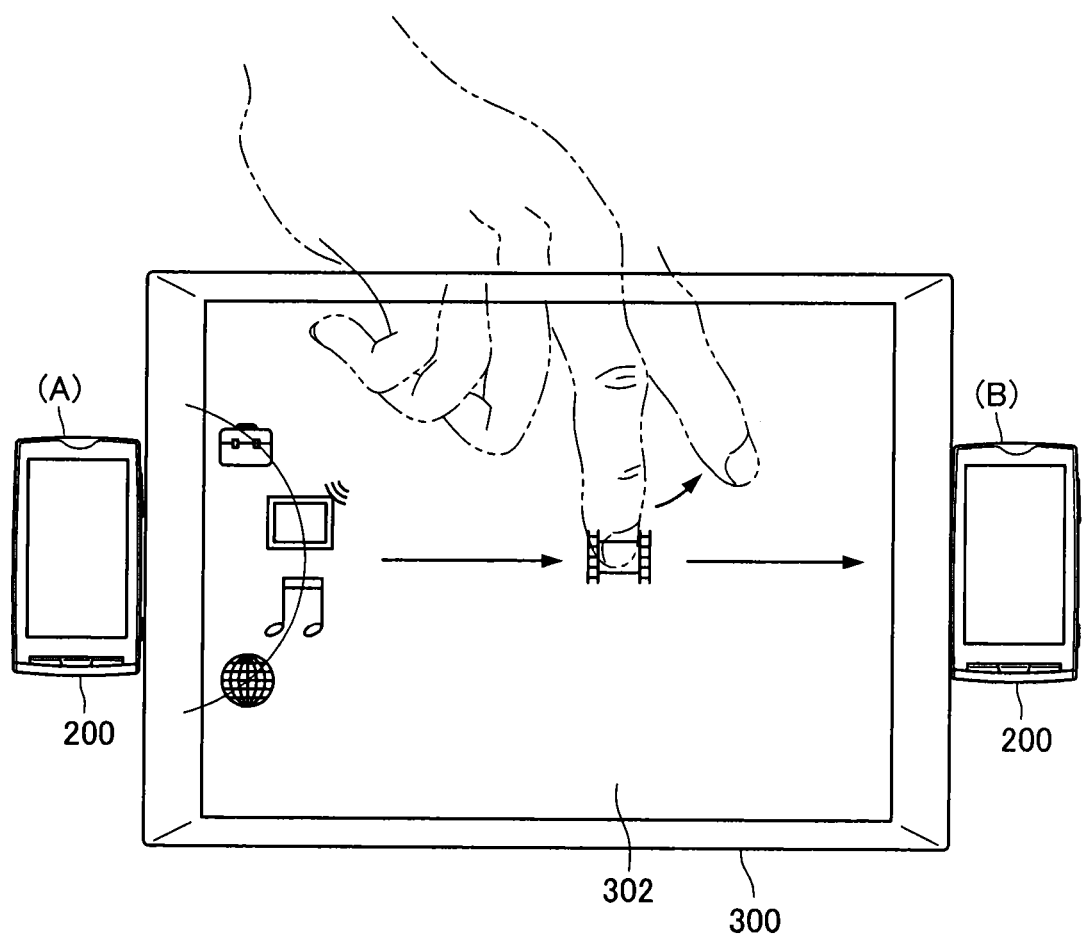
FIG. 25 is a schematic diagram showing an example in which contents are moved by performing flicking between mobile devices with an information processing apparatus interposed therebetween.

FIG. 25 is a schematic diagram showing an example in which content are moved by performing flicking between two mobile devices 200 with an information processing apparatus interposed therebetween. As illustrated in FIG. 25, a mobile device (A) 200 and another mobile device (B) 200 are disposed on the left and right sides of the information processing apparatus 300 and both of the devices are connected to the information processing apparatus 300. At this moment, contents of the mobile device (A) 200 on the left side are displayed forming a semi-circular shape on the display unit 302. The user can move the contents to the mobile device (B) 300 by operating the touch panel 170 of the display unit 302. In this case, when the distance between the contents and the mobile device (B) 200 is close to an extent of a predetermined value or shorter by an operation of the touch panel 170, for example, data is transmitted to the mobile device (B) 200 by the transmission data processing section 112. In this case, the contents are transferred from the mobile device (A) 200 to the information processing apparatus 300, and then temporarily stored in the data accumulation unit 130 of the information processing apparatus 300. After that, under a predetermined condition, the contents are transferred to the mobile device 200 (B) by the transmission data processing section 112 of the information processing apparatus 300. In this manner, in the present embodiment, contents are temporarily stored in the information processing apparatus 300, without being directly moved from the mobile device (A) 200 to the mobile device 200 (B).

In addition, in the state illustrated in FIG. 25, it is possible to synchronize contents of both mobile devices 200. In this case, it may be possible to perform a synchronization operation in such a way that the contents of both mobile devices 200 are displayed in semi-circular shapes as shown by the mobile device (A) 200 of FIG. 25, and flicked in both directions by operations of the touch panel 170. In addition, the progress of a synchronization process may be displayed using the number of remaining data pieces. It is also possible to display UIs such that displays of contents are removed from one that has undergone synchronization. By performing the synchronization process in this manner, it is possible to equalize information retained in two mobile devices 200.

Figure 26:
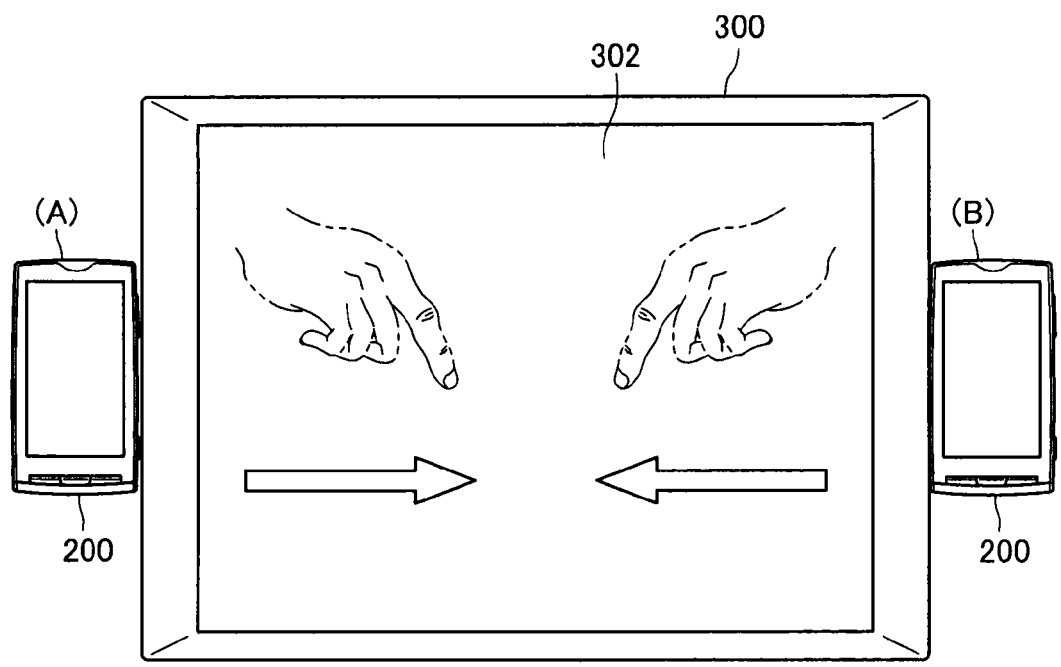
FIG. 26 is a schematic diagram showing a state in which synchronization is performed by signaling with a gesture.

FIG. 26 is a schematic diagram showing a state in which synchronization is performed by signaling with a gesture. As illustrated in FIG. 26, using a touch panel operation on the display unit 302, when the touch panel is operated to the right direction from the mobile device (A) 200 on the left side, information of the mobile device (A) 200 on the left side is synchronized with the mobile device (B) 200 on the right side. In addition, when the touch panel is operated to the left direction from the mobile device (B) 200 on the right side, information of the mobile device (B) 200 on the right side is synchronized with the mobile device (A) 200 on the left side.

Figure 27:
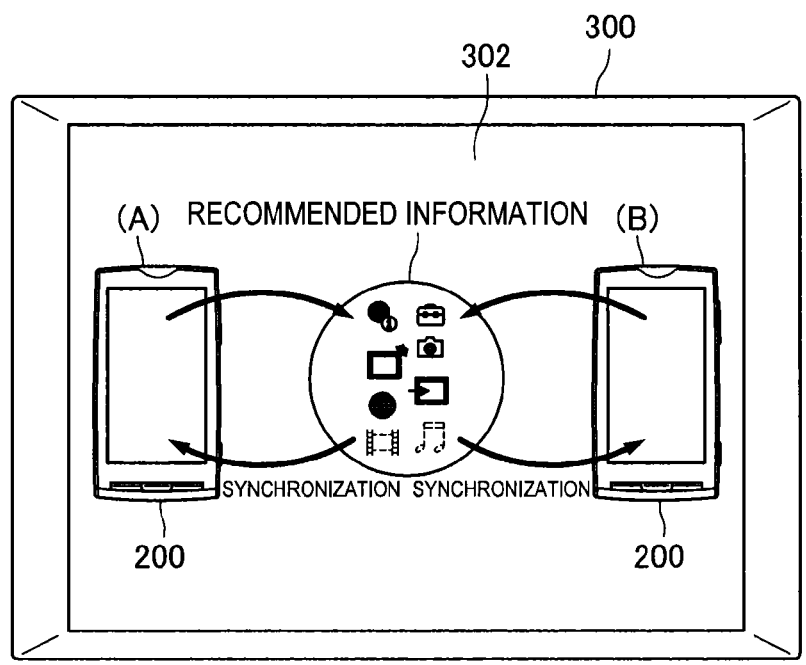
FIG. 27 is a schematic diagram showing a state in which information on a database of the information processing apparatus is in synchronization with a mobile device (A) and a mobile device (B).

FIG. 27 is a schematic diagram showing a state in which information on a database of the information processing apparatus 300 is in synchronization with the mobile device (A) 200 and the mobile device (B) 200. The example illustrated in FIG. 27 shows that recommended information is displayed on the display unit 302 of the information processing apparatus 300 and the information is in synchronization with the mobile device (A) 200 and the mobile device (B) 200. Accordingly, the mobile device (A) 200 and the mobile device (B) 200 can acquire the recommended information of the database together. In this case, if connection to the mobile devices 200 is established in the state in which the recommended information of the database is displayed on the display unit 302 by the display processing section 118, the displayed information of the database is transmitted to the mobile 200. Note that the recommended information can be stored in the data accumulation unit 130.

Figure 28:
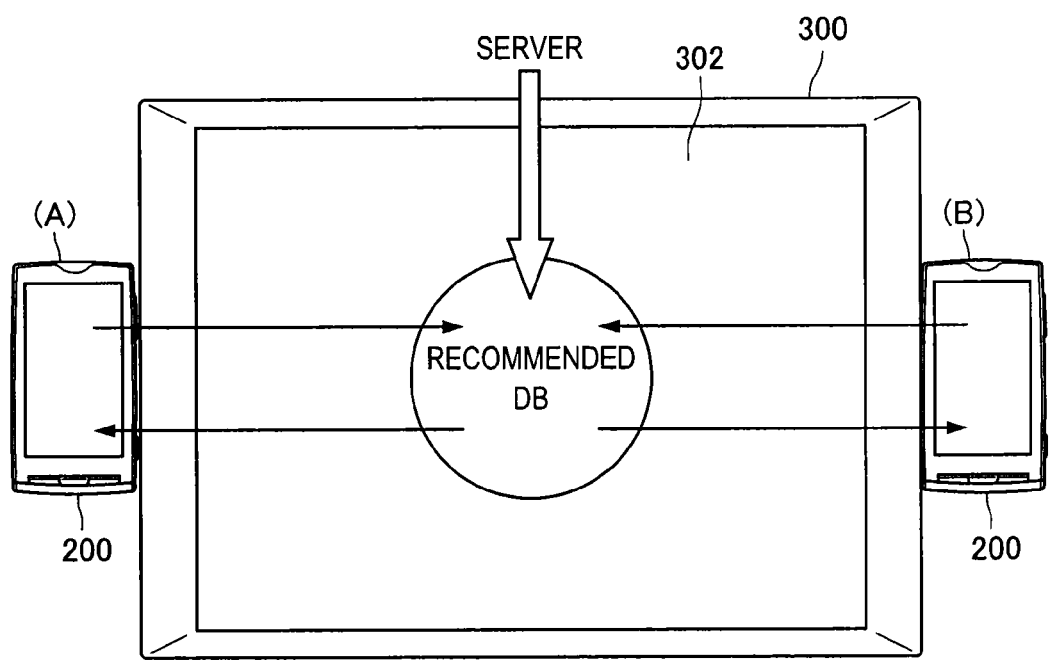
FIG. 28 is a schematic diagram showing a state in which information of a recommended database is duplicated as the latest information using information on a server.

FIG. 28 illustrates a state in which the information processing apparatus 300 is connected to an external server through a communication line such as the Internet and information of a recommended database is duplicated as the latest information using information on the server. By updating information of the recommended database to the latest one at all times, it is possible to enhance convenience for backup, transfer, and the like.

Figure 29:
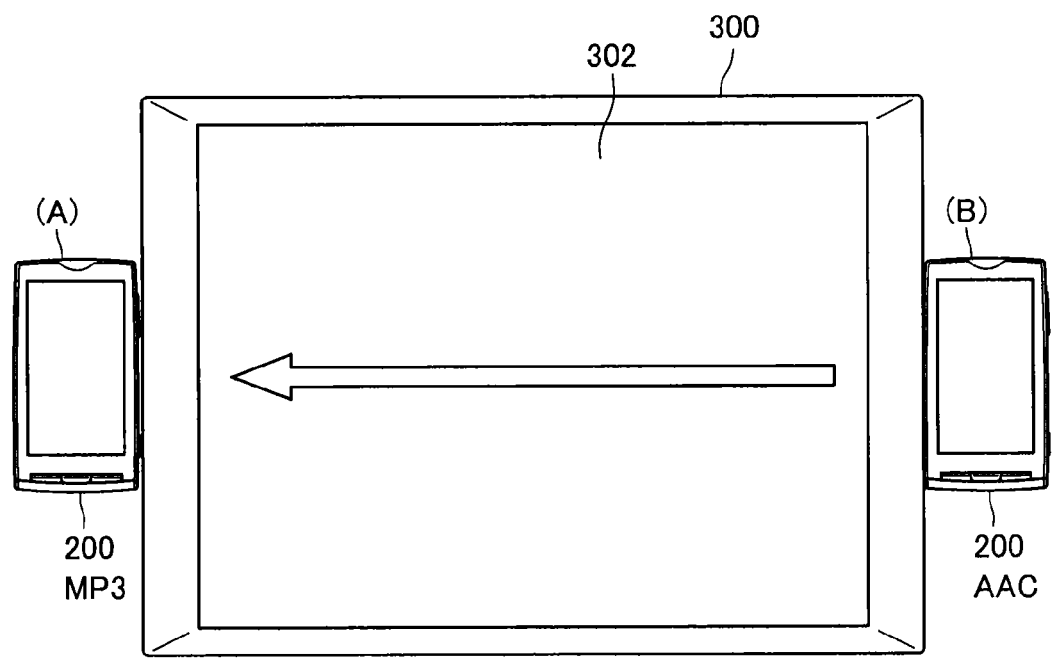
FIG. 29 is a schematic diagram showing a state in which copying is performed while transcoding is performed.

FIG. 29 is a schematic diagram showing a state in which copying is performed while transcoding is performed. When data is moved between portable music players, mobile telephones, or the like, for example, the information processing apparatus 300 performs copying by converting (transcoding) a format. In the example illustrated in FIG. 24, transcoding from an AAC (Advanced Audio Coding) format to an MP3 format is performed. Accordingly, on behalf of the mobile device 200, the information processing apparatus 300 can execute a process that is too burdensome for the mobile device. A format that each mobile device 200 can handle is acquired from information specifying the mobile device 200.

Figure 30:
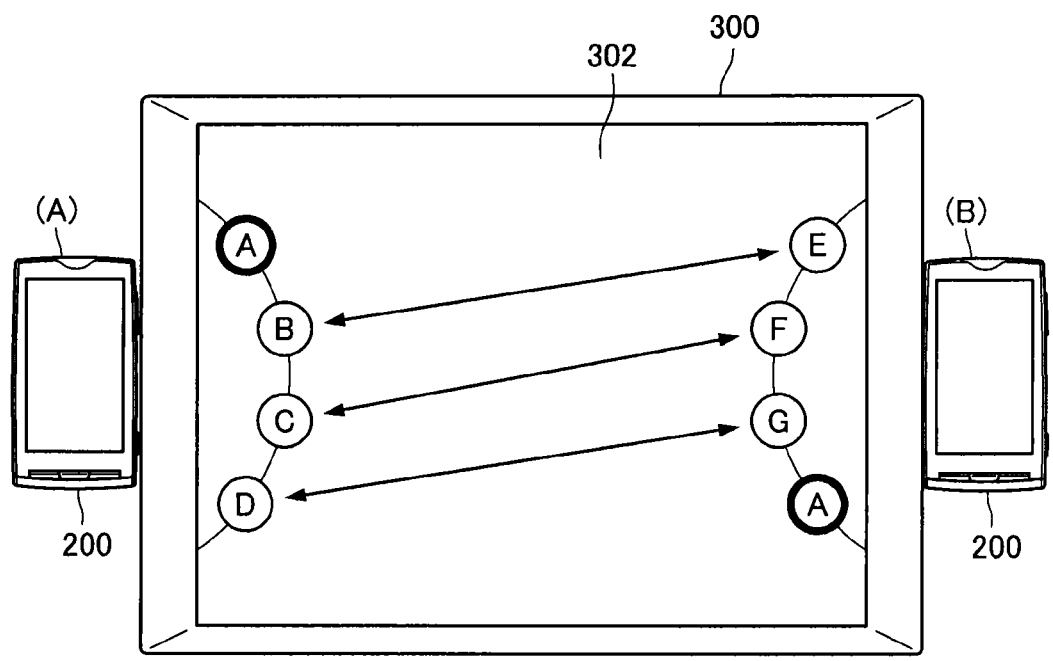
FIG. 30 is a schematic diagram showing a state in which addresses are exchanged between two devices such as the mobile device (A) and the mobile device (B).

FIG. 30 is a schematic diagram showing a state in which, when the mobile devices 200 retain e-mail addresses, the addresses are exchanged between two devices such as the mobile device (A) 200 and the mobile device (B) 200. In this case, when the mobile device (A) 200 and the mobile device (B) 200 are connected via the information processing apparatus 300, if there is address information that one device does not retain on address books of two mobile devices 200, address exchange is performed by transmitting the address from one device that has retained it to the other device that has not retained it. In the example illustrated in FIG. 30, addresses that both mobile devices 200 retain are displayed on the display unit 302 and both mobile devices 200 commonly retain only an address A. For this reason, addresses that are not shared are transferred to the other mobile device 200 and then copied in the mobile device 200. Accordingly, address information of two mobile devices 200 can be shared. In this case, both mobile devices 200 compare their own address information to address information received by the reception data processing section 116, and the transmission data processing section 112 transmits an address that the communication counterpart device does not have. Note that the address information can be stored in the data accumulation unit 130.

Figure 31:
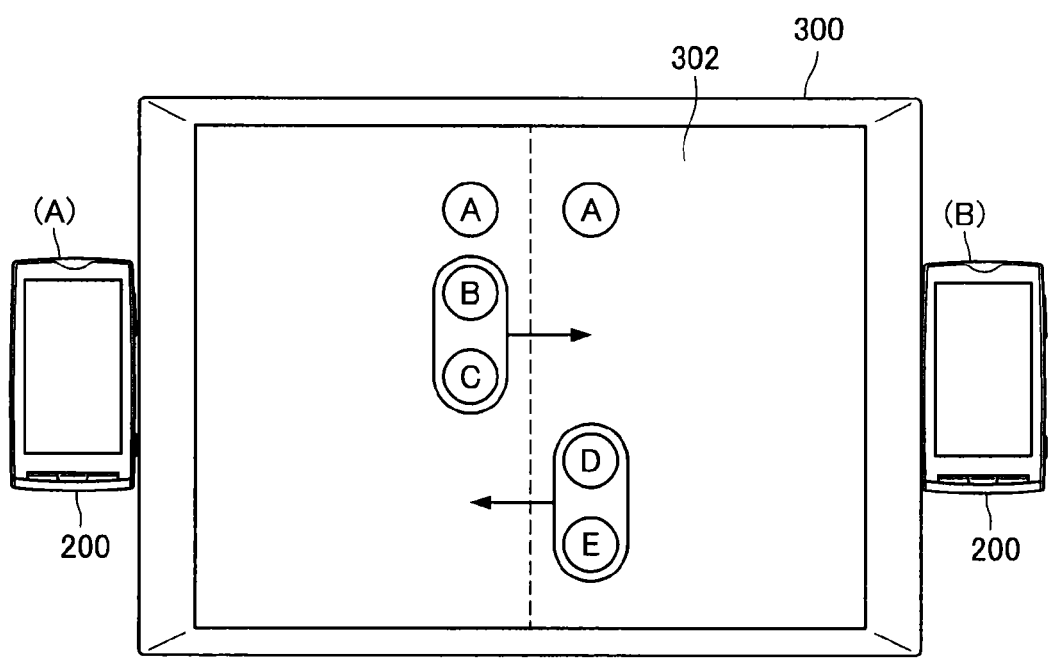
FIG. 31 is a schematic diagram showing a state in which a plurality of addresses are encircled and selected in a touch panel, and the encircled addresses are exchanged.

In addition, during address exchange, it is also possible to display a UI for selecting an address. As shown in FIG. 31, for example, it may be possible for a plurality of addresses to be bound and selected using an operation of the touch panel 170 and the bound addresses exchanged. In the example illustrated in FIG. 31, addresses B and C of the mobile device (A) 200 are bound by an operation of the touch panel 170 and transmitted to the mobile device (B) 200. In addition, addresses D and E of the mobile device (B) 200 are bound by an operation of the touch panel 170 and transmitted to the mobile device (A) 200.

In addition, a technique of, for example, introducing a social networking service based on address information that is shared together is considered. In this case, a correlation chart may be elicited together by exchanging address information between the mobile devices 200. Such an operation may be executed when the mobile device (A) 200 and the mobile device (B) 200 retain the same information (in the example of FIG. 30, the address A).

In the examples above, although the case of disposing the mobile devices 200 on the side face of the information processing apparatus 300 is mainly shown, the same processes can also be performed when the mobile devices 200 are placed on the display unit 302. When the mobile devices 200 are placed on the display unit 302 and the distance between the mobile devices 200 is closer than a predetermined value, data is exchanged in a state closer to synchronization, according to the distance between the two mobile devices 200. In addition, it is possible to perform a process in which only data with a high degree of correlation is exchanged as the two mobile devices 200 are separated.

In this case, if both mobile devices 200 are brought close to each other after the mobile devices 200 are placed on the display unit 302, synchronization of data is started. The start of data synchronization is displayed using a UI (for example, a UI of ripple). It is possible to set the mobile devices 200 such that they have respective regions (territory) around the devices and if the regions overlap, an action (synchronization) is accordingly started.

Figure 32:
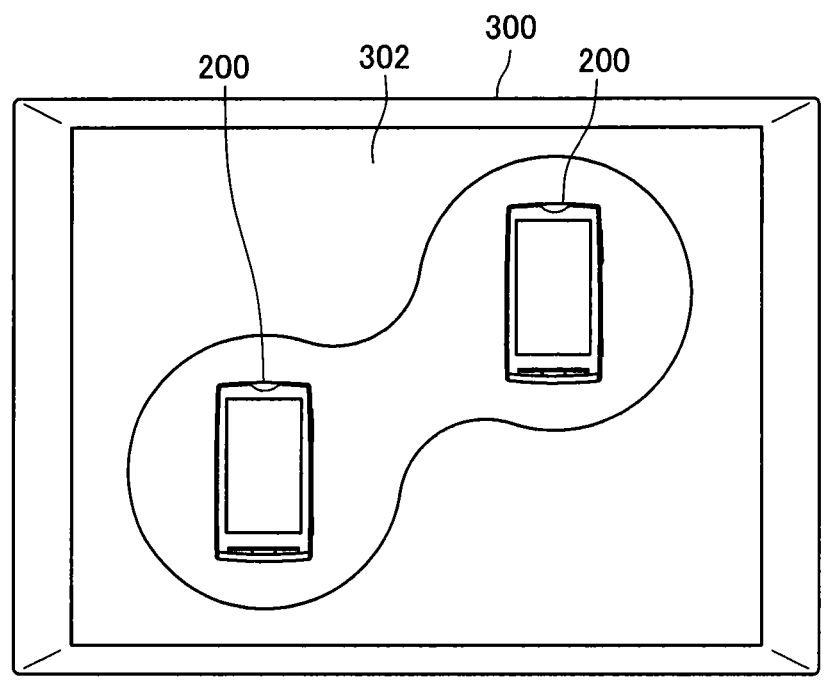
FIG. 32 is a schematic diagram showing a state in which, when the mobile devices are placed on the display unit, synchronization is performed according to the distance between the devices.
Figure 33:
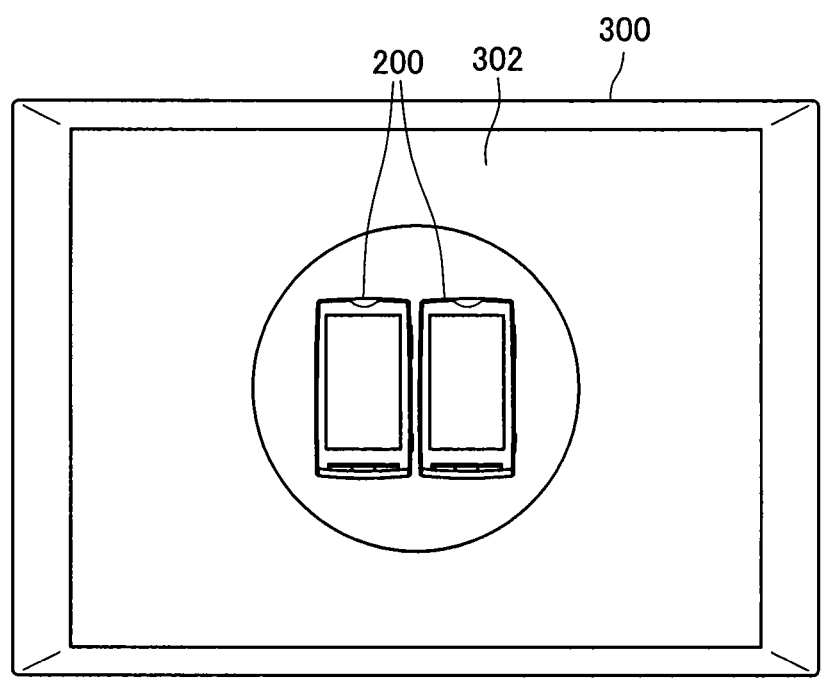
FIG. 33 is a schematic diagram showing another state in which, when the mobile devices are placed on the display unit, synchronization is performed according to the distance between the devices.
Figure 34:
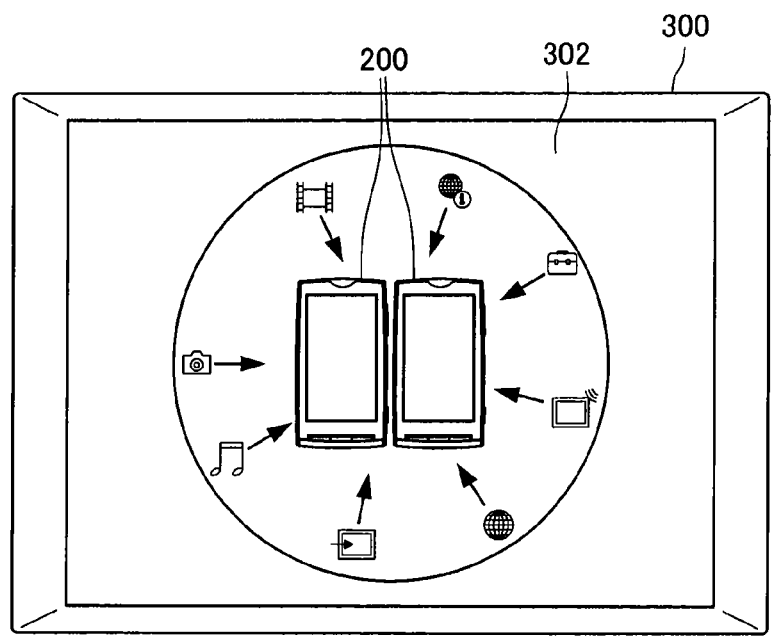
FIG. 34 is a schematic diagram showing still another state in which, when the mobile devices are placed on the display unit, synchronization is performed according to the distance between the devices.

FIGS. 32 to 34 are schematic diagrams showing states in which, when the mobile devices 200 are placed on the display unit 302, synchronization is performed according to distances. As illustrated in FIG. 32, when the distance between the two mobile devices 200 exceeds a predetermined value, only data with a high degree of correlation is transferred and partial synchronization is performed. In addition, as illustrated in FIG. 33, when the distance between the two mobile devices 200 is a predetermined value or lower, all information of both mobile devices 200 is copied and full synchronization is performed. In this case, as illustrated in FIG. 34, all data pieces are displayed around the two mobile devices 200, and displays of pieces of data that have undergone synchronization are set to sequentially disappear. Accordingly, the user can determine the progress of data copy from the display state.

Figure 35:
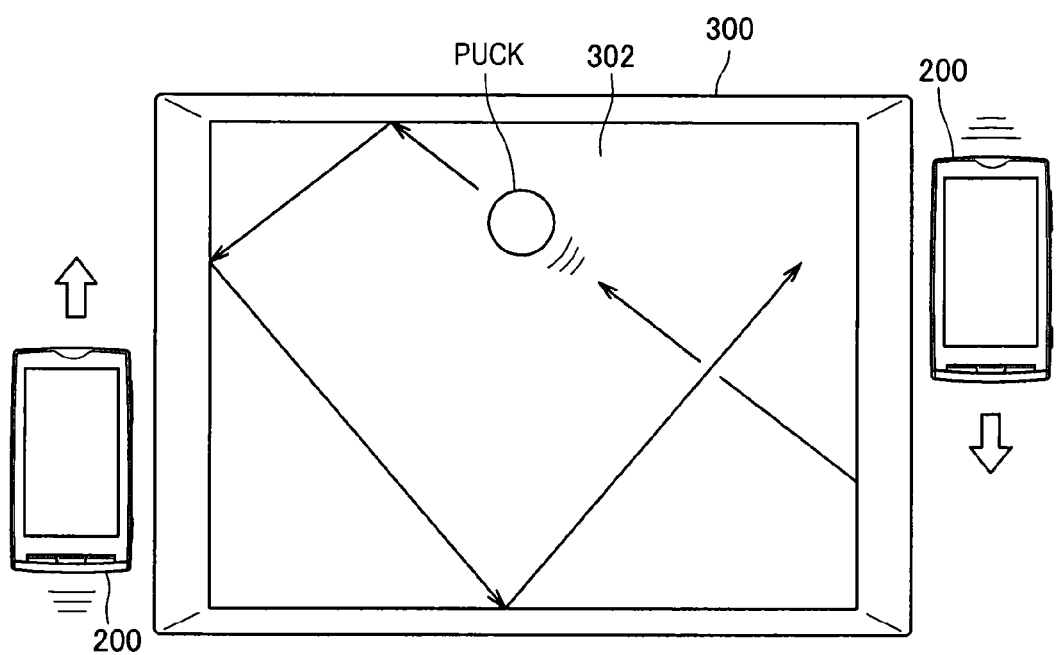
FIG. 35 is a schematic diagram showing a state of playing hockey with the display unit inserted, as an application of synchronization.

FIG. 35 is a schematic diagram showing a state of playing hockey with the display unit 302 inserted, as an application of synchronization. Here, information that one mobile device 200 retains is displayed on the display unit 302 being likened to a hockey puck, and when the puck transmitted from one mobile device 200 is caught by the other mobile device 200, synchronization for the information is performed. In this case, when a location on the right or left side of the display unit 302 that the puck contacts coincides with the locations of the mobile devices 200, the mobile device 200 is assumed to have caught the puck. Alternatively, it is possible to set synchronization for the information to be performed when the puck transmitted from one mobile device 200 is not caught by the other mobile device 200.

3. Third Embodiment

Next, a third embodiment of the present invention will be described. The third embodiment relates to processes of synchronization, transmission, enlargement, complementation, or the like for images between the mobile device 200 and the information processing apparatus 300. When the mobile device 200 is placed on the display unit 302, by causing a display on the display unit 302 to be transmitted to the display unit 202 of the mobile device 200, an image of the display unit 302 that would otherwise be hidden under the mobile device 200 can be recognized, and an operation through the mobile device 200 is also possible. In addition, by enlarging a display of the display unit 302 and displaying it on the display unit 204, it is possible to enlarge and view desired contents.

Figure 36:
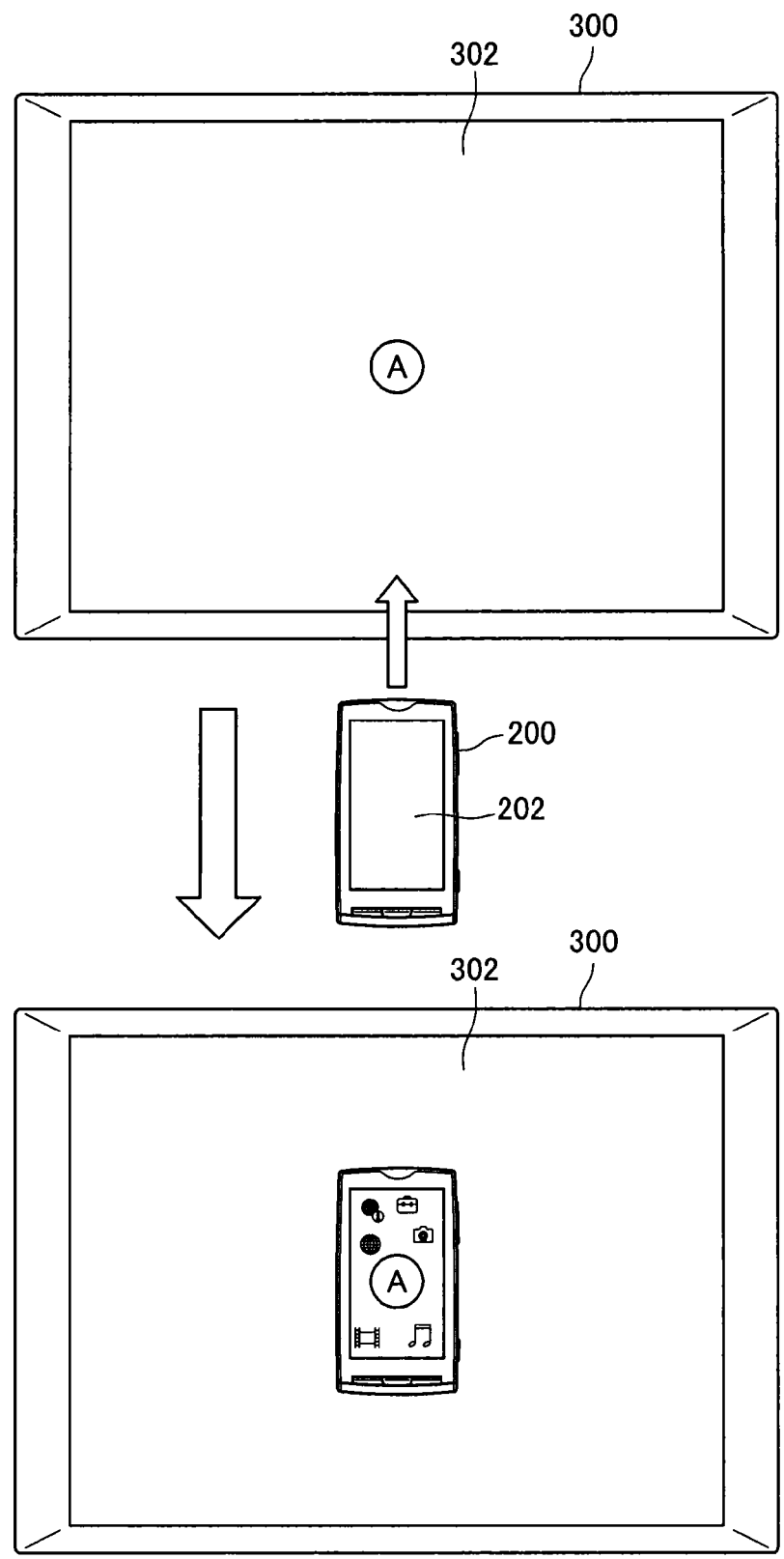
FIG. 36 is a schematic diagram showing a state of displaying contents "A" as if the contents are transmitted to the mobile device.

FIG. 36 illustrates a state in which, when contents "A" are displayed on the display unit 302, if the mobile device 200 is placed thereon as if the device covers the contents "A," the contents "A" is displayed on the display unit 202 of the mobile device 200 as if the contents "A" is transmitted to the mobile device 200.

In this manner, in the example of transmission, if the mobile device 200 is placed on the display unit 302 (on a large-sized display), the display of the display unit 302 is transmitted and displayed on the display unit 202. In this case, it is possible to set a UI to be changed according to whether the contents can be moved from the information processing apparatus 300 to the mobile device 200 or not. Further, as a function to be realized in combination of transmission, when the mobile device 200 is held, it is possible to set a function (an icon or a menu) corresponding to the combination of the mobile device 200 to be displayed on the display unit 202 of the held mobile device 200. In the process of the third embodiment, the location detection section 120 detects the location of the mobile device 200 on the display unit 302 based on the intensity of a reception signal detected by the reception signal intensity (electric field intensity) detection section 114. The location of the mobile device 200 is compared to the location of contents, an icon, or the like that has undergone a display process by the display processing section 116, on the display unit 302, and when the location of the mobile device 200 and the location of the icon or the like on the display unit 302 coincide, information of the icon or the like is transmitted from the transmission data processing section 112 to the mobile device 200. Accordingly, in the mobile device 200, the received information of the icon or the like can be displayed on the display unit 202.

In addition, as illustrated in FIG. 36, for example, on the display unit 202 of the held mobile device 200, information of the display unit 302 below the held location and the function (menu) corresponding thereto are displayed. In this case, the transmission data processing section 112 of the information processing apparatus 300 transmit information on contents, an icon, or the like of which the display location on the display unit 302 coincides with the location of the mobile device 200 and information on the function (menu) relating thereto, or the like, to the mobile device 200. Accordingly, the mobile device 200 can display on the display unit 202 not only the information such as the contents, the icon, or the like that would otherwise be hidden in the back side thereof, but also the relevant information. When the function of the mobile device 200 does not correspond to the information, the menu is set not to be shown even if the device is held. Alternatively, the menu may be grayed out.

In addition, it is possible to set a function to be used in the mobile device 200 (a function that can be realized in combination of the mobile device 200 and the information processing apparatus 300) to be displayed when the mobile device 200 is held on an icon, or the like, on the display unit 302.

In addition, when contents are displayed in advance on the mobile device 200 to be held in the upper side and the contents are to be moved to the information processing apparatus 300 to be held in the lower side, a UI can be used as if the display unit 202 of the mobile device 200 to be held in the upper side is copied to the display unit 302 of the information processing apparatus 300 to be held in the lower side. Accordingly, the user can visually recognize copying (movement) of contents from the mobile device 200 to the information processing apparatus 300.

Figure 37:
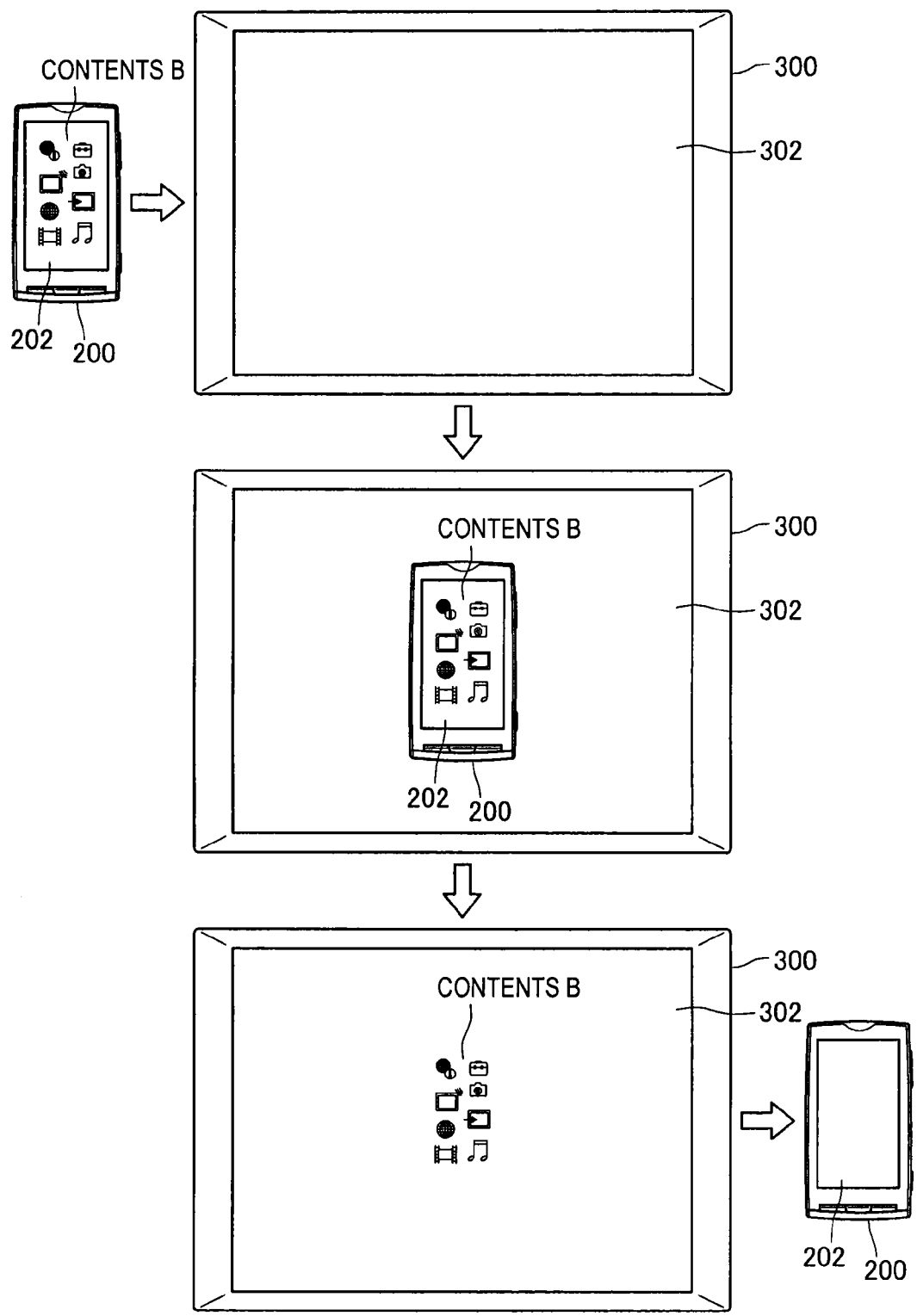
FIG. 37 is a schematic diagram showing a state in which data is moved from the mobile device to the information processing apparatus.

FIG. 37 is a schematic diagram showing a state in which data is moved from the mobile device 200 to the information processing apparatus 300. As illustrated in the drawing of the upper part of FIG. 37, contents B are displayed on the display unit 202 of the mobile device 200 before being held over the information processing apparatus 300. The drawing in the middle part of FIG. 37 illustrates the state in which the mobile device 200 displaying the contents B is held over the display unit 302. When the mobile device 200 is held, information of the contents B is transferred to the information processing apparatus 300. The drawing in the lower part of FIG. 37 illustrates the state in which the mobile device 200 is kept away from the display unit 302 from the state of the middle part of FIG. 37. When the mobile device 200 is kept away from the display unit 302, the transferred information of the contents B is displayed on the display unit 302. Accordingly, the user can visually recognize transfer of the contents B from the mobile device 200 to the information processing apparatus 300.

Figure 38:
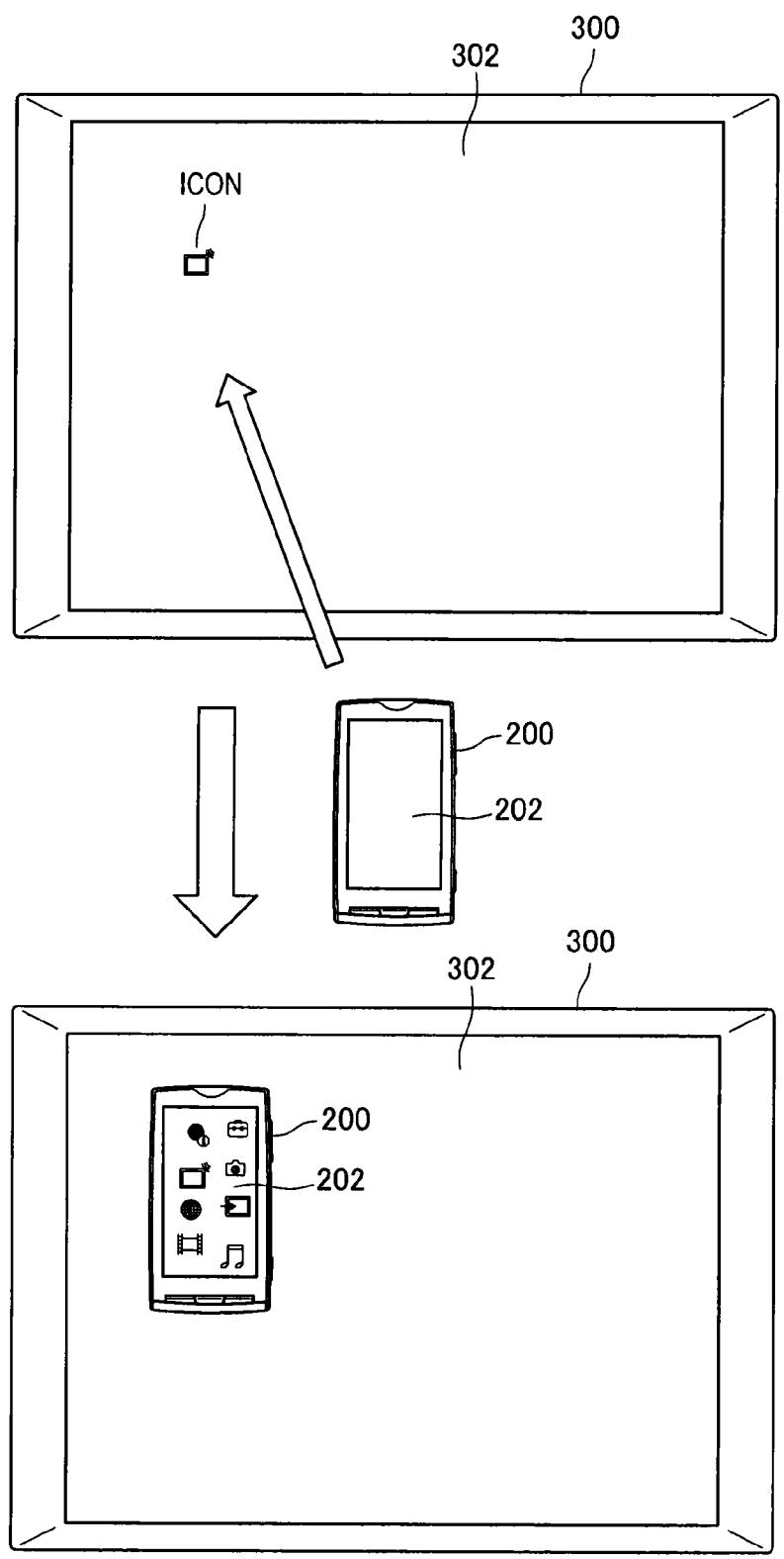
FIG. 38 is a schematic diagram showing an example in which, when the mobile device is held on a folder icon, the content of the folder is displayed on the display unit of the held mobile device.

Next, an example in which an icon on the display unit 302 is displayed on the display unit 202 of the mobile device 200 in an enlarged manner will be described. FIG. 38 illustrates an example in which, when the mobile device 200 is held on a folder icon displayed on the display unit 302, the contents of the folder are displayed on the display unit 202 of the held mobile device 200 to be held in the upper side. In this case, the operation can also be applied to a security purpose in such a way that the contents are shown only through a specific device to be held in the upper side.

Figure 39:
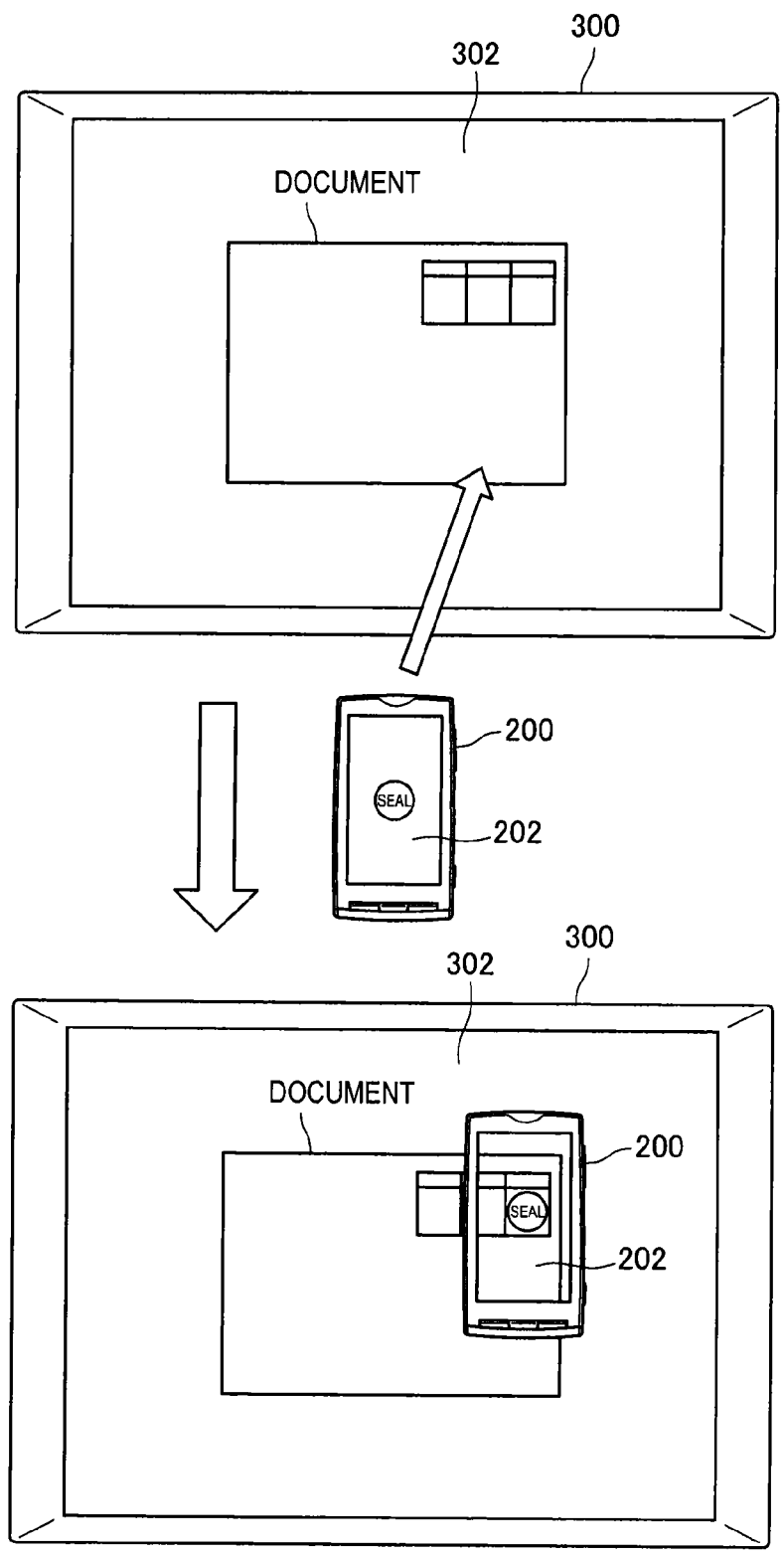
FIG. 39 is a schematic diagram showing a state in which an electronic seal is imprinted on a document displayed on the display unit using the mobile device.

In addition, as an application example of FIG. 38, the mobile device 200 can be used as an electronic seal (authorization). FIG. 39 is a schematic diagram showing a state in which an electronic seal is imprinted on a document displayed on the display unit 302 using the mobile device 200. As illustrated in the drawing in the upper part of FIG. 39, a document is displayed on the display unit 302 and an electronic seal is displayed on the display unit 202 of the mobile device 200. The mobile device 200 is assumed to be authorized to imprint the electronic seal. Then, as illustrated in the drawing in the lower part of FIG. 39, when the mobile device 200 is held on the display unit 302, the imprinting location on the document that has been displayed on the display unit 302 is transmitted and displayed on the display unit 202. If a predetermined operation is performed in this state, the electronic seal of the mobile device 200 is imprinted on the document on the display unit 302, and the document on the display unit 302 is in the state in which the seal is imprinted. By enlarging the display of the document on the display unit 202 of the mobile device 200 larger than on the display unit 302, it is possible to make it easier to press the seal.

Figure 40:
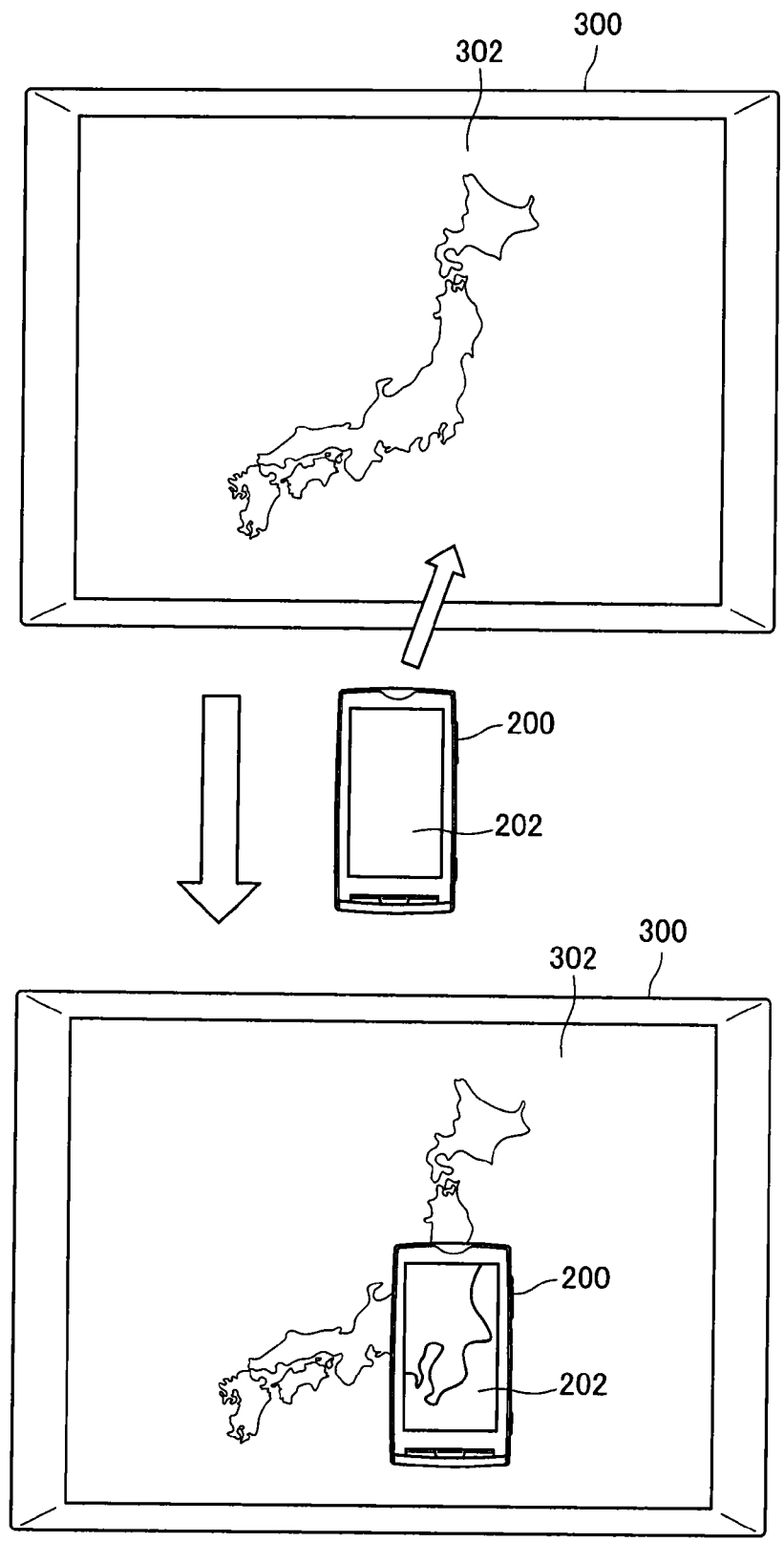
FIG. 40 is a schematic diagram showing an example in which a map of Japan is displayed on the display unit of the information processing apparatus, and by holding the mobile device over the map, regions around the Kantō area are displayed on the display unit of the mobile device in an enlarged manner.

Next, a case will be described in which a map displayed on the display unit 302 is enlarged and displayed on the display unit 202 of the mobile device 200. FIG. 40 illustrates an example in which a map of Japan is displayed on the display unit 302, and by holding the mobile device 200 thereover, regions around the Kanto area are enlarged and displayed on the display unit 202. It is possible to display not only the enlarged and displayed regions, but also information on the regions (restaurant information, transportation information including railway and road traffic, weather information of the regions, and the like). In this case, information on the regions is added to the map information displayed in the information processing apparatus 300 in advance, and the information is acquired by the mobile device 200 so as to be displayed on the display unit 202.

In addition, by displaying regions other than the regions displayed on the display unit 302 on the display unit 202, it is also possible to complement information of the world in a panoramic view. For example, it is possible to set that the mobile device 200 to be placed outside the display unit 302, and a map of regions other than the region displayed on the display unit 302 to be displayed on the display unit 202 as an extended screen.

Further, in addition to a map, when the mobile device 200 is held over a photo (group photo, or the like), for example, a function can be equipped with which a person in the photo is enlarged and displayed on the display unit 202, and the person included in the address book or the like of the held mobile device 200 is searched so that the result is displayed. In this case, information of the person in the photo displayed on the information processing apparatus 300 is given in advance, and search is performed by comparing the information with information of the address book.

4. Fourth Embodiment

Next, a fourth embodiment of the present invention will be described. The fourth embodiment relates to guiding the mobile device 200 to a location providing favorable communication when the mobile device 200 is held on the information processing apparatus 300. For example, a UI indicating the location of the antennas 304 is displayed on the display unit 302 only when wireless communication is used. In addition, when the mobile device 200 is held on the display unit 302 and the location of the mobile device 302 deviates from the location of the antennas 304, a UI guiding the device to a proper location of the antenna is displayed. Further, a UI for guidance is displayed on the display unit 202 of the mobile device 200.

Figure 41:
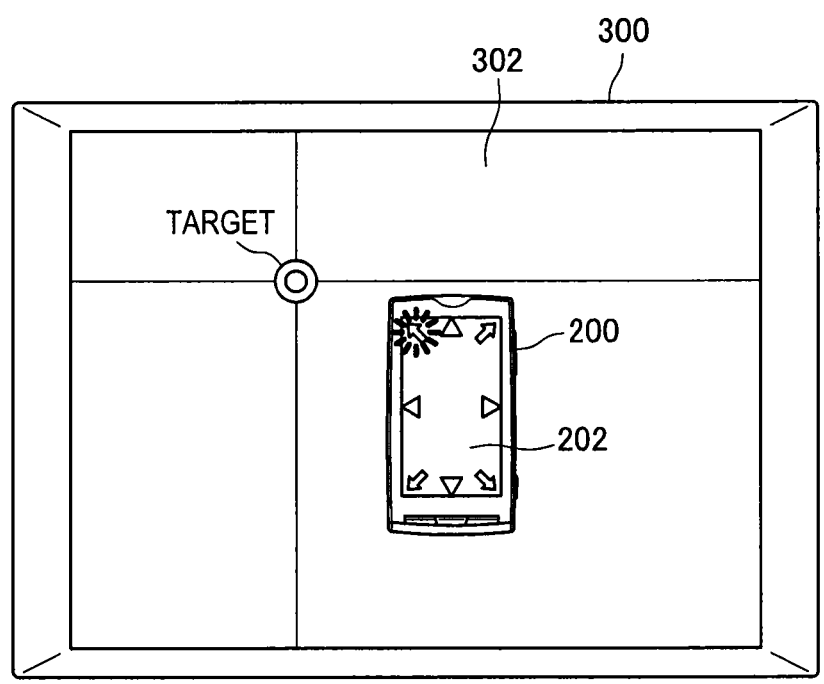
FIG. 41 is a schematic diagram showing a state in which, when the mobile device is placed on the display unit, a UI for guidance is displayed on the display unit.

FIG. 41 is a schematic diagram showing a state in which, when the mobile device 200 is placed on the display unit 302, a UI for guidance is displayed on the display units 202 and 302. As illustrated in FIG. 41, by displaying arrows indicating proper directions on the display unit 202 of the mobile device 200 and moving the mobile device 200 in those directions, it is possible to guide the mobile device 200 to the location of the antennas 304. In the example illustrated in FIG. 41, the arrow in the upper left side of the display unit 202 is displayed brighter than other arrows (or displayed in a flickering manner), and the mobile device 200 is set to be guided in the corresponding direction. When the mobile device 200 is located on the antennas 304 and accordingly in the best communication state, the state is displayed. In addition, as illustrated in FIG. 41, cross lines indicating a "target" for guidance to the location of the antenna may be displayed on the display unit 302. In this case, the location detection section 120 of the mobile device 200 or the information processing apparatus 300 detects a current location of the mobile device 200 and a location with the best intensity of a reception signal based on the intensity of a reception signal detected by the reception signal intensity (electric field intensity) detection section 114. The display processing section 118 performs a display process of guiding the device to the direction providing the best intensity of a reception signal.

In addition, as another method, a method of guiding by causing the held mobile device 200 to make a sound, vibration, or the like can be used. In this case, since the antenna sensitivities (distributions) of devices are different, guidance is performed while the difference is corrected. The sound-vibration output section 126 shown in FIG. 5 outputs a sound or a vibration for performing guidance in the direction with the best intensity of a reception signal. As an example, when a sound is to be output, a sound indicating the direction with the best intensity of a reception signal is set to be output, and another sound indicating the best intensity of a reception signal is set to be output at the corresponding location. In addition, when a vibration is to be output, a vibration indicating the direction with the best intensity of a reception signal is set to be output and the vibration is set to stop at the location with the best intensity of a reception signal.

5. Fifth Embodiment

Next, a fifth embodiment of the present invention will be described. The fifth embodiment relates to an electronic pen 400 performing communication with the information processing apparatus 300. The electronic pen 400 includes a recording unit (storage device) 402 for recording data and a wireless communication unit 404. The wireless communication unit 404 has the same configuration as that described in FIG. 4. The electronic pen 400 performs various kinds of content movement operations such as absorbing and recording displayed folders, and the like surrounded by an operation of the pen, using gestures of the pen.

Figure 42:
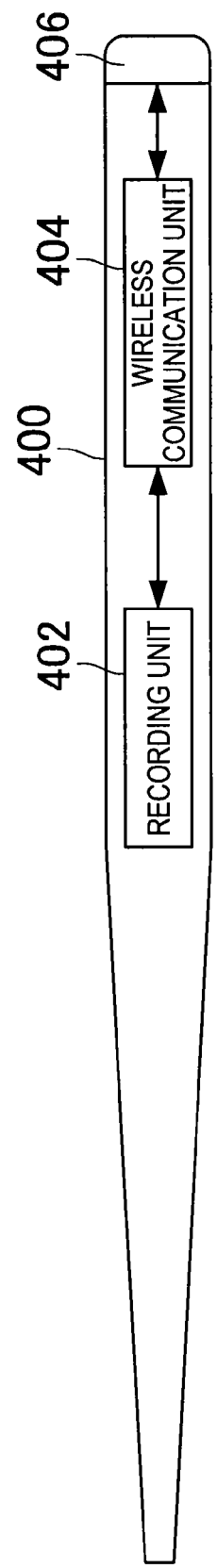
FIG. 42 is a schematic diagram showing a configuration of an electronic pen.

FIG. 42 is a schematic diagram showing a configuration of the electronic pen 400. The front end of the electronic pen 400 forms a normal stylus with a sharp shape. An antenna 406 for wireless communication is mounted on the rear end thereof.

FIGS. 43 and 44 are schematic diagrams showing states in which the electronic pen 400 is used. First, the absorption (accumulation) of data by the electronic pen 400 will be described. The absorption of data is performed in three steps. First, as illustrated in FIG. 43, the front end of the electronic pen 400 performs drawing as if contents on the display unit 302 are surrounded. Then, the touch sensor 170 detects the drawing, and a line is drawn on the display unit 302 along the trace of the pen tip. At this moment, one or a plurality of contents can be surrounded together.

Next, with the electronic pen 400 being held upside down, the antenna 406 at the rear end of the electronic pen 400 faces the display unit 302. Then, the rear end of the electronic pen 400 is held over the display unit 302. Accordingly, the electronic pen 400 is connected to the information processing apparatus 300 by wireless communication, and data of the surrounded contents is transferred from the information processing apparatus 300 to the electronic pen 400. Since the information processing apparatus 300 recognizes the trace of the pen tip, if connection with the electronic pen 400 is established, the data of the contents included in the range is transmitted. The data of the contents transferred to the electronic pen 400 is saved in the recording unit 402.

Next, dumping (transmission) of data by the electronic pen 400 will be described. Dumping of data is performed in one step. In the state of the recording unit 402 with the data saved therein, if the rear end of the electronic pen 400 is held facing the display unit 302 as illustrated in FIG. 44, wireless communication connection is performed between the electronic pen 400 and the information processing apparatus 300, and the data held in the recording unit 402 is transferred to the information processing apparatus 300. Accordingly, the data held in the recording unit 402 is copied to the desktop of the display unit 302.

Note that, with regard to a location at which the electronic pen 400 is held, when the antennas 304 are provided on the circumference of the information processing apparatus 300 as described in FIG. 3, the electronic pen 400 is set to be held in the vicinity of the antennas 304. In addition, when the antennas 304 are provided over the entire region of the display unit 302 as shown in FIG. 2, the electronic pen 400 is set to be held over the display unit 302.

In addition, it is possible to perform setting such that, if the electronic pen 400 is held over a predetermined selected area provided on the display unit 302, data is absorbed, and further, a function is selected by clicking an icon, and if the electronic pen is held over an area other than the selected area, data is dumped.

Note that the electronic pen 400 may be equipped with the functions of the mobile device 200 described in the first to the fourth embodiments. In this case, the electronic pen 400 does not have a display, but can display a menu, or the like. Without a display, although the electronic pen 400 is light and suitable for carrying, user convenience and excitement of checking contents retained in the electronic pen 400 through the display unit 302 (large-sized display) of the information processing apparatus 300 each time can still be provided.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

106 Transmission processing unit
108 Reception processing unit
114 Reception signal intensity (electric field intensity) detection section
118 Display processing section
200 Mobile device
300 Information processing apparatus
302 Display unit

The invention claimed is:

1. An information processing apparatus comprising:
circuitry configured to
perform near-field non-contact one-to-one communication with a communication counterpart device,
acquire a communication situation with the communication counterpart device via the near-field non-contact one-to-one communication,
perform a display process for performing guidance in a direction in which the communication situation is favorable based on the acquired communication situation acquired via the near-field non-contact one-to-one communication, and
display the guidance on the information processing apparatus and the communication counterpart device.

2. The information processing apparatus according to claim 1,
wherein the circuitry has a plurality of antennas, and
wherein the circuitry acquires a communication situation with the communication counterpart device based on the intensity of a reception signal obtained by each of the plurality of antennas.

3. The information processing apparatus according to claim 1,
wherein the circuitry performs a process for displaying a display indicating a direction in which the communication situation is favorable.

4. The information processing apparatus according to claim 1, wherein the circuitry is further configured to:
output a sound or a vibration for facilitating the guidance in the direction in which the communication situation is favorable.

5. An information processing system comprising:
a first device that performs communication with a second device using near-field one-to-one communication, wherein
the second device includes circuitry configured to
perform near-field one-to-one communication with the first device,
acquire a communication situation with the first device via on the near-field non-contact one-to-one communication,
perform a display process for performing guidance in a direction in which the communication situation is favorable based on the acquired communication situation acquired via the near-field non-contact one-to-one communication, and
display the guidance on the second device, and
the first device also displays the guidance.

6. A non-transitory computer-readable medium storing computer-readable instructions thereon, the computer-readable instructions when executed by an information processing apparatus causes the information processing apparatus to perform a method comprising:
performing near-field one-to-one communication with a communication counterpart device;
acquiring a communication situation with the communication counterpart device via the near-field non-contact one-to-one communication; and
performing a display process on the information processing apparatus and the communication counterpart device for performing guidance in a direction in which the communication situation is favorable based on the acquired communication situation acquired via the near-field non-contact one-to-one communication.

7. The information processing apparatus according to claim 1, wherein the near-field non-contact one-to-one communication is a TransferJet communication.

8. The information processing apparatus according to claim 1, wherein the guidance displayed on one of the information processing apparatus and the communication counterpart device includes an arrow pointing in the direction in which the communication situation is favorable.

9. The information processing apparatus according to claim 1, wherein the guidance displayed on one of the information processing apparatus and the communication counterpart device includes lines crossing at a target indicating the direction in which the communication situation is favorable.

10. The information processing apparatus according to claim 4, wherein,
when the sound is output for facilitating the guidance, a different sound is output when the communication situation between the information processing apparatus and the communication counterpart device is favorable, and
when the vibration is output for facilitating the guidance, the vibration stops when the communication situation between the information processing apparatus and the communication counterpart device is favorable.

11. The information processing system according to claim 5, wherein the guidance displayed on one of the first device and the second device includes an arrow pointing in the direction in which the communication situation is favorable.

12. The information processing system according to claim 5, wherein the guidance displayed on one of the first device and the second device includes lines crossing at a target indicating the direction in which the communication situation is favorable.

13. The information processing system according to claim 5, wherein, the circuitry of the second device is further configured to output a sound or a vibration for facilitating the guidance in the direction in which the communication situation is favorable, when the sound is output for facilitating the guidance, a different sound is output when the communication situation between the first device and the second device is favorable, and when the vibration is output for facilitating the guidance, the vibration stops when the communication situation between the first device and the second device is favorable.

14. The non-transitory computer-readable medium according to claim 6, wherein the guidance displayed on one of the information processing apparatus and the communication counterpart device includes an arrow pointing in the direction in which the communication situation is favorable.

15. The non-transitory computer-readable medium according to claim 6, wherein the guidance displayed on one of the information processing apparatus and the communication counterpart device includes lines crossing at a target indicating the direction in which the communication situation is favorable.

16. The non-transitory computer-readable medium according to claim 6, wherein, the method further comprising outputting a sound or a vibration for facilitating the guidance in the direction in which the communication situation is favorable, when the sound is output for facilitating the guidance, a different sound is output when the communication situation between the information processing apparatus and the communication counterpart device is favorable, and when the vibration is output for facilitating the guidance, the vibration stops when the communication situation between the information processing apparatus and the communication counterpart device is favorable.

* * * * *